United States Patent [19]

Hoy et al.

[11] 4,426,485

[45] Jan. 17, 1984

[54] POLYMERS WITH HYDROPHOBE BUNCHES

[75] Inventors: Kenneth L. Hoy, St. Albans; Richard C. Hoy, South Charleston, both of W. Va.

[73] Assignee: Union Carbide Corporation, Danbury, Conn.

[21] Appl. No.: 388,202

[22] Filed: Jun. 14, 1982

[51] Int. Cl.³ .................... C08L 33/08; C08L 75/08
[52] U.S. Cl. .................................. 524/591; 528/60; 528/67; 528/68; 528/69; 528/77; 528/85
[58] Field of Search ................. 524/591; 528/60, 67, 528/68, 69, 77, 85

[56] References Cited

U.S. PATENT DOCUMENTS

| | | | |
|---|---|---|---|
| 3,779,970 | 12/1973 | Evani et al. | 524/523 |
| 3,794,608 | 2/1974 | Evani et al. | 526/271 |
| 3,796,678 | 3/1974 | Bartizal | 524/591 |
| 3,970,606 | 7/1976 | Field et al. | 526/264 |
| 4,061,618 | 12/1977 | Stanley et al. | 524/591 |
| 4,079,028 | 3/1978 | Emmons et al. | 528/67 |
| 4,138,381 | 2/1979 | Chang et al. | 524/833 |
| 4,167,502 | 9/1979 | Lewis et al. | 524/556 |
| 4,169,818 | 10/1979 | De Martino | 524/43 |
| 4,209,333 | 6/1980 | Ong et al. | 106/25 |
| 4,209,605 | 6/1980 | Hoy et al. | 528/54 |
| 4,228,277 | 10/1980 | Landoll | 536/91 |
| 4,230,844 | 10/1980 | Chang et al. | 525/379 |
| 4,268,641 | 5/1981 | Koenig et al. | 525/379 |
| 4,304,902 | 12/1981 | Landoll | 528/419 |

FOREIGN PATENT DOCUMENTS

| | | | |
|---|---|---|---|
| 11806 | 11/1979 | European Pat. Off. | |
| 13836 | 8/1980 | European Pat. Off. | 524/591 |
| 53-85894 | 7/1978 | Japan | 524/591 |

*Primary Examiner*—Ronald W. Griffin
*Attorney, Agent, or Firm*—Henry H. Gibson

[57] ABSTRACT

A water-soluble, thermoplastic, organic polymer is disclosed having segments of bunched monovalent hydrophobic groups. These polymers provide superior thickening and leveling in aqueous systems, through micelle-like associations, and aid suspension of particulate materials in non-aqueous systems.

40 Claims, 3 Drawing Figures

POLYMERS WITH HYDROPHOBE BUNCHES

BACKGROUND OF THE INVENTION

1. Field of the Invention

This invention relates to water-soluble, thermoplastic, organic polymers, and more particularly, to such polymers having segments of bunched, monovalent, hydrophobic groups.

2. Description of the Prior Art

There are several basic theories by which water-soluble polymers are believed to thicken aqueous systems such as waterborne coatings and latex paints. The theory of "Chain Entanglement" requires the polymer to have a very high molecular weight which in solution translates to an extremely large hydrodynamic volume. The thickening occurs because the long, solvated polymer chains comingle with one another producing "chain entanglements." FIG. 1 of the drawings illustrates a simplistic model of this thickening mechanism. In FIG. 1, the lines depict soluble thickener polymer molecules and the lined circles represent latex particles with both polymers and particles suspended in a body of water. The salient points of this model are (a) there is no interaction of the water soluble thickener polymer chains with the latex particles; (b) under shear conditions, the water-soluble thickener polymer chains orient or are visco-elastically deformed resulting in a lowered viscosity (shear thinning); and (c) upon removal of the shear the visco-elastic polymer chains recover immediately resulting in very poor flow and leveling properties for the aqueous system. It is believed that the more established thickeners, i.e., the traditional cellulosics, natural gums, and very high molecular weight, synthetic, water-soluble polymers achieve their thickening effects by this "chain entanglement" mechanism as illustrated in FIG. 1.

Another theory of thickening in aqueous systems can be called "Particle Bridging" or "Association Thickening." This theory is proposed by coating technologists of the Dow Chemical Company to explain the thickening action which occurs in latexes and waterborne coatings by certain synthetic thickeners. The Particle Bridging theory is described in a pamphlet entitled "'ELT' Experimental Liquid Thickeners XD-30255.02L and XD-30457.02L" distributed by the Dow Chemical Company.

The Particle Bridging theory is offered to account for the thickening properties of relatively low molecular weight synthetic thickeners described in a series of patents including U.S. Pat. No. 3,779,970 (Evani I). These polymers are composed of two different segments: (1) the backbone of the polymer, which is water-soluble, and (2) long polyalkylene oxide branches each terminated by a hydrophobic moiety. The long branches are attached to the polymer backbone much like the teeth of a comb to the comb's backbone, such that these polymers are characterized as "comb polymers". The combination of the polyalkylene oxide branches terminated by the hydrophobic moieties provides the polymer with certain qualities of a surfactant. Consequently, the thickening action of these comb polymers is suggested to be by particle-to-particle bridging in which the hydrophobic moiety terminating the individual teeth of the copolymer are postulated to adsorb at the latex particle surface much in the nature of a surfactant. Since there is a plurality of teeth on each polymer backbone, simultaneous interaction of a single polymer molecule with two or more particles can create an apparent three-dimensional network. This pseudo-network is considered to account for a viscosity increase. FIG. 2 of the drawings illustrates this Particle Bridging theory. The important aspects of this theory are (a) a specific interaction, i.e., adsorption, is required of the surfactant tooth at the particle surface; being that, it is assumed that the hydrophobic tooth moiety displaces the stabilizing surfactant or colloid already present on the surface of the particle; (b) under a shear field or shear inducement, the bridged particles of the latex are mechanically separated causing the adsorbed toothlike moieties to be wrested from the surface, i.e., desorbed such that there is a viscosity decrease (shear thinning); and (c) upon removal of the shear force, the recovery is diffusion controlled and governed by the rate of readsorption resulting in a viscosity increase at a relatively controlled rate so as to achieve good flow and leveling properties. The polymers of these structures are indicated to exhibit a better rheology than those which operate by the "chain entanglement" mechanism. Such polymers are alleged to provide much better flow and leveling characteristics to waterborne coatings and latex systems than do the traditional cellulosic thickening agents.

In relying upon the Particle Bridging theory one has to stress the criticality of the total polymeric molecular structure because in order to have the hydrophobic moiety adsorb on the latex particle surface, the hydrophobic moiety must be chemically attached to a hydrophilic moiety of a type which allows particle adsorption and displacement of the surface active agent or colloid which is already present on the particle surface. In particular, U.S. Pat. No. 3,779,970 (Evani I) discloses at column 1, lines 51 to 59 that "It is important to the invention that the esterifying moiety be a monohydroxyl containing nonionic surfactant and that the hydrophobic group of the surfactant be spaced apart from the polymer backbone by a hydrophilic polyethylene oxide (polyoxyethylene) chain having at least about 10 oxyethylene units in the chain. In addition, the nonionic surfactant should have an HLB of at least about 12, preferably 14." It is also disclosed at column 4, lines 23 to 28, that "it is believed that the nature of the hydrophobic group of the surfactant and the distance by which it is separated from the backbone of the polymeric material are important in providing the improved flow and leveling properties as well as thickening power to the latex paint." In addition, U.S. Pat. No. 3,794,608 (Evani II) discloses polymer backbones containing nonionic or anionic hydrophilic comonomers as well as hydrophobic comonomers which must be balanced in a particular fashion to produce optimum performance of the thickener polymer, as discussed in Evani II at column 3, lines 17 to 25.

Additional patents disclosing random type polymers containing bound surfactants, or other copolymers having a random configuration of hydrophobic groups, include U.S. Pat. No. 4,167,502 (Lewis et al.); U.S. Pat. No. 4,169,818 (DeMartino); U.S. Pat. No. 4,230,844 (Chang I); U.S. Pat. No. 4,268,641 (Koenig et al.); U.S. Pat. No. 4,138,381 (Chang II); European patent application publication number 13,836 (Chang III) which discloses a hydrophobe poor environment, by describing at page 10, lines 17–19, that the thickening property of the polymer reaches a maximum as surfactant is added; and European patent application publication number 11,806 (Sonnebend) which discloses at page 11, lines 7–11 that "it is critical to the performance of these products that they contain an effective amount of an in situ, bound surfactant to control the rheology of the aqueous system thickened with the solubilized emulsion polymer" and is therefore similar to the Evani patents in relying on total polymeric structures.

Another procedure for arranging hydrophobic groups is disclosed in U.S. Pat. No. 4,079,028 (Emmons et al.). Polyurethane polymers are disclosed having hydrophobic groups capping a hydrophilic polyether polymer backbone. Although it is disclosed at column 7, lines 33 to 41 that the polymers "thicken by an associative mechanism such as micellar or other form of association" Emmons et al. at column 14, lines 14 to 28, disclose that terminal monovalent hydrophobic groups are desired. It is disclosed, at column 14, lines 66–68 that these polymer structures are useable for thickening water alone. Another patent of general interest in this area is U.S. Pat. No. 4,209,333 (Ong et al.) which discloses star-shaped polymers using an ester linkage for hydrophobe attachment, in place of a urethane linkage as described in Emmons et al.

Other patents of interest in this general area include: (1) U.S. Pat. No. 3,970,606 (Field et al.) which discloses random interpolymers of N-vinyllactam or acrylamide, hydrophobic group containing vinyl comonomers and a cationic moiety. The patent suggests in Table V at Columns 7 and 8 that as the content of the hydrophobe containing monomer is varied from 0.8 mole % to 9.1 mole %, the thickening efficiency of the polymer is altered only slightly. (2) U.S. Pat. No. 4,228,277 (Landoll I) discloses water-soluble, substituted cellulose ethers modified with $C_{10}$ to $C_{24}$ alkyl groups and is of interest in disclosing at column 7, lines 57 to 62, that "the behavior of the modified polymers in exhibiting surface activity, as well as their rheological character, suggest that the long chain modified molecules are aggregated into micelle-like clusters in aqueous solution much as is known to happen in the case of more conventional surfactants." As such Landoll I is disclosing that the entire polymer backbone is involved in micelle formation. Similar to the Particle Bridging Theory, Landoll I discloses at column 8, lines 2 to 5 that "surface activity is also noticeable to a significant degree with latex paints where the long-chain alkyl substituted products show a tendancy to adsorb on non-polar latex particles." Landoll I also includes a disclosure at column 2, lines 62 to 65 that a uniform presence of hydrophobic groups is required to achieve thickening. Furthermore, it is disclosed at column 8, lines 6 to 16 that viscosity increases with the addition of free surfactant, which as explained hereinafter exemplifies hydrophobic poor structures. (3) Another patent of general interest is U.S. Pat. No. 4,304,902 (Landoll II) which discloses random copolymers of ethylene oxide and long chain epoxides.

SUMMARY OF THE INVENTION

The present invention relates to a water-soluble, thermoplastic, organic polymer having a weight average molecular weight of at least about 10,000. The polymer comprises hydrophobic segments each containing at least one monovalent hydrophobic group covalently bonded to the polymer. The polymer has an amount of bunching, defined as hydrophobic segments comprising at least two monovalent hydrophobic groups, sufficient to provide for enhanced thickening of aqueous solutions containing the polymer. Processes for the production and use of such polymers are also described.

DETAILED DESCRIPTION OF THE INVENTION

It has now been found that good thickening and leveling properties in waterborne coatings can be achieved without tailor-making the polymeric backbone structure in a configuration such as espoused by Evani I and others. Extremely effective, indeed the most superior, thickening and leveling properties can be introduced into waterborne coating systems without the necessity of providing polymeric backbones of unique structures other than providing those polymers with the capacity to be dissolved in water to the degree necessary for the application at hand. It has been found that all that is necessary to provide synthetic, water-soluble thickeners most desirable for use in waterborne coating systems is the introduction to a water-soluble polymeric backbone of special bunches of monovalent hydrophobic groups, said monovalent hydrophobic groups hereinafter referred to as hydrophobes. One achieves through these bunches an interaction and interconnection of the various dissolved water-soluble polymers. This interaction and interconnection results in an associative crosslinking of these polymers such that within the aqueous phase they form a network resulting in a unique thickening action, and also provide extremely good flow and leveling properties. It is believed that the unique polymers of this invention provide good thickening and leveling properties to a waterborne system by the "Micellar Bridging" theory.

Figure 1:
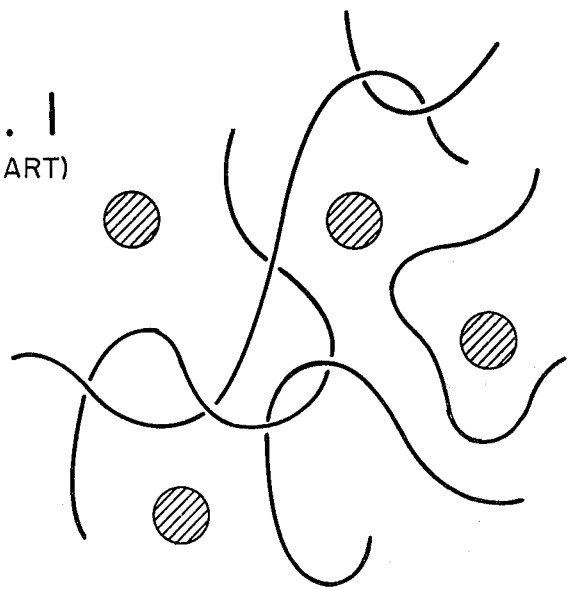
FIGS. 1 and 2 present pictorial representations of the thickening mechanisms of polymer compositions of the prior art.
Figure 2:
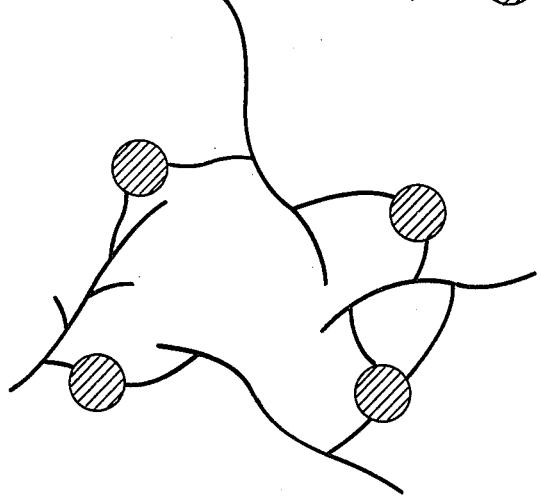
Figure 3:
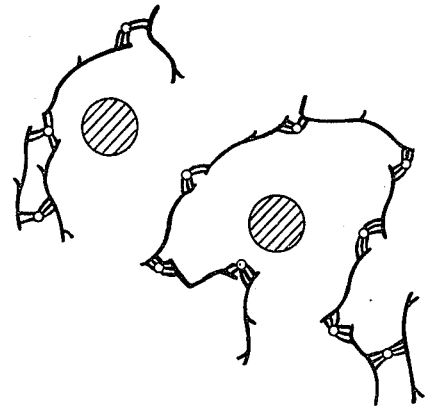
FIG. 3 presents a pictorial representation of the thickening mechanism of a composition containing a polymer of the present invention.

A schematic representation of the Micellar Bridging theory is characterized by FIG. 3 wherein the added small circles represent micelle-like associations involving bunched hydrophobes. The important features to know about Micellar Bridging are that: (a) there are no particle-to-polymer interactions required for thickening to take place (for example, the polymers of this invention have the capacity of thickening pure water); (b) the interaction of the hydrophobes provide a capacity to effectively crosslink the polymers sufficiently to cause an increase in the viscosity and hence achieve the desired thickening characteristics; (c) under shear conditions, the aqueous thickened system is readily torn apart because the micelle-like associations which are formed to effect the crosslinking are very readily destroyed by the high energy introduced by the shearing action, resulting in a rapid decrease in the viscosity of the aqueous phase of the waterborne system; and (d) upon removal of shear force, there is a time-dependent rebuilding of the inter-polymeric, micelle-like associations which are necessary for effecting the aforementioned crosslinking of the aqueous polymers and for the rebuilding of the thickened structure. This time dependence provides the consequent good flow and leveling characteristics which are sought in waterborne coating systems.

As indicated above, the Micellar Bridging theory is based upon the existence within the aqueous phase of intermolecular, micelle-like associations between the hydrophobes bonded to the water-soluble polymer. In the broadest characterization the term "micelle-like association" is intended to mean the approximate aggregation of at least two hydrophobes serving to exclude water at that proximity. Micelle-like association can be looked at as a congregation of hydrophobes which locally excludes water. These micelle-like associations are dynamic, molecular, hydrophobic associations, which occur in aqueous solution. These associations occur only in abundance above a critical concentration, i.e., the critical micelle concentration, CMC. CMC can be defined as the amount of hydrophobe containing compound which is required to saturate a solution at standard conditions, such that the addition of any more hydrophobe containing compound will produce a phase separation on a molecular level resulting in the formation of micelle-like associations. As such, at a concentration above the CMC, the amount of free hydrophobe containing compound, i.e., having unassociated hydrophobes, in solution will not increase. The time averaged, i.e., equilibrium, number and size of micelle-like associations are constant at constant conditions, such as temperature, concentration, ionic strength and the like. The duration of time that an individual micelle-like association exists is related to the (1) chemical potential of the hydrophobe as compared to its (aqueous) environment and (2) steric factors, such as the proximity of one hydrophobe to another, which aid and abet the approach of two or more hydrophobes to each other. The chemical potential of the hydrophobe, $\Delta\mu$, can be roughly estimated by the equation:

$$\Delta\mu = 2RT - \frac{V_s + V_p}{2}(\delta_s - \delta_p)^2 x^2 \quad (I)$$

wherein R is the universal gas constant; T is temperature in degrees Kelvin; $V_s$ and $V_p$ are the molar volumes of the solvent (water) and the hydrophobe respectively; $\delta_s$ and $\delta_p$ are the solubility parameters of the solvent (water) and hydrophobe respectively; and x is the volume fraction concentration of hydrophobe present. This chemical potential equation can be deduced from the theory of the solubility of liquids in liquids as presented in *The Solubility of Non-Electrolytes*, by J. H. Hildebrand and R. L. Scott at page 253, published by Dover Publication, Inc., New York, N.Y. (1964). The more negative the value of $\Delta\mu$, the stronger the propensity to form and maintain micelle-like associations. Thus, strong hydrophobic associations are possible where there is a large disparity between the molar volumes of the solvent (water) and the hydrophobe, as well as a large difference between the solubility parameters. Weak associations occur when only slight differences between these two factors exist. When the chemical potential is zero or positive, aggregation by hydrophobic association, i.e., micelle-like association, is not expected and the system is below critical micelle concentration, CMC. Indeed under such conditions materials should be mutually soluble.

There is described herein novel polymeric structures with properties making them eminently suitable for use in aqueous and non-aqueous compositions, while creating unique and useful properties and effects when so used. The polymers of this invention are characterized by having bunches of hydrophobes interbonded to the water-soluble backbone. As a result, the polymer contains a mass of both a water-soluble polymer component and a hydrophobic component that act separately from each other bringing unique attributes to the total polymer.

The novel polymers of this invention provide a unique thickening capability in aqueous systems which is believed to stem from the unique, deliberate, bunching arrangement of the hydrophobes interbonded to the water-soluble backbone. These hydrophobes, bunched as they are, have the ability to readily form micelle-like associations in water, with hydrophobes from other molecules of the polymer. Because the micelle-like associations interconnect a number of polymers, there is a build-up of interlocking water-soluble polymer backbones achieved through this micelle-like association. Such interlocking of hydrophobes in micelle-like associations, by "micellar bridging," causes a dramatic increase in the apparent molecular weight of the polymer resulting in an increased viscosity of the aqueous medium.

The Micellar-Bridging theory applies to the polymers of this invention in aqueous systems and conceptually allows a greater degree of freedom from the high degree of specificity in the definition of the particular polymer backbone than is predicted by the Particle Bridging theory, while at the same time explains why the utilization of bunches of hydrophobes provides unique rheology to dilute aqueous solutions of the polymers of the present invention.

The implication of the Micellar Bridging theory is that the particular structure of the polymeric backbone which generates water-solubility is not critical to the performance of the polymer in the thickening operation other than providing a hydrophilic quality to the molecule. What is critical is the placement of the hydrophobes in the polymer so as to enhance bridging of polymer chain to polymer chain thereby achieving enhanced thickening in aqueous systems.

As pointed out previously, much of the prior art, such as Evani I, has utilized the Particle Bridging theory to theorize the manner in which these particular polymers were capable of increasing the viscosity of latex and waterborne coatings while at the same time providing desirable leveling characteristics. Because the polymers of this invention are believed to operate according to the Micellar Bridging theory, it is inconsequential to the practice of this invention as to the particular structure of the polymeric backbone involved so long as it provides the water-soluble characteristics to the total polymer and at the same time provides the substrate for the attachment of hydrophobic groups, as hereinafter defined.

The critical feature of the present invention is the provision in the water-soluble polymer of hydrophobic segments which have monovalent hydrophobic groups, i.e., hydrophobes, with at least one of those hydrophobic segments having at least two hydrophobes thereby forming a bunch of hydrophobes within that hydrophobic segment. In particular, the hydrophobes within a bunched hydrophobe segment are in close association or proximity, preferably separated from each other by no more than about 50, most preferably less than about 25, covalently bonded, sequentially connected atoms, sufficient to provide for enhanced thickening of aqueous solutions containing the polymer through the formation of intermolecular, micelle-like associations. A hydrophobic segment is defined as that portion of the water-soluble polymer having at least one hydrophobe, with at least one hydrophobic segment in said polymer having at least two hydrophobes. Such bunches serve the unique function of providing for the nucleation of extraordinarily strong, intermolecular, micelle-like associations when incorporated in an aqueous medium. In preferred embodiments, the water-soluble polymer contains an average of greater than about 0.25, preferably from about 0.4 to about 11, bunched hydrophobe segments per polymer molecule. The polymer may contain up to a substantial proportion of hydrophobic segments having bunched hydrophobes. In another embodiment, essentially all the hydrophobic segments in the water-soluble polymer have bunched hydrophobes.

The average number of hydrophobes per hydrophobic segment is preferably greater than about 1.2. The average number of hydrophobes per bunched hydrophobe segment is preferably from 2 to about 6, and most preferably from about 3 to about 4 hydrophobes per bunched hydrophobic segment. The number of hydrophobes per hydrophobic segment required to provide optimum thickening efficiency can be decreased by either increasing the molar volume of the hydrophobe or by reducing its contribution to the solubility parameter.

The polymer will preferably contain from about 2 to 25 hydrophobic segments, both bunched and unbunched, and most preferably from about 4 to about 11 segments per molecule. The number of hydrophobic segments is not critical so long as a sufficient number of bunched hydrophobe segments is provided to enable the generation of intermolecular, micelle-like associations when the polymer is in aqueous solution.

It is to be understood that the benefits of this invention can be achieved in many cases by a relatively low concentration of polymer molecules which contain bunched hydrophobes of this invention in mixtures with polymer molecules which do not contain such hydrophobes.

The composition of the hydrophobic compounds from which the hydrophobes are derived is not critical so long as the hydrophobes provide a molar volume contribution of greater than about 70 cubic centimeters per mole, and preferably greater than about 160 cubic centimeters per mole, and having a nominal contribution to the calculated solubility parameter of less than about 9.5 (cal./cc)$^{\frac{1}{2}}$, and preferably from about 6.5 to about 8.5 (cal./cc)$^{\frac{1}{2}}$. The molar volume and solubility contributions of various hydrophobes are readily estimated from their structure using methods well described in the literature, as in "New Values Of The Solubility Parameter From Vapor Pressure Data", by K. L. Hoy, *Journal of Paint Technology*, Volume 482, 116 (1970); "Solubility Parameters For Film Formers", by H. Budell, *Official Digest*, 726 (1955); "Molar Volume Additivity Of Polymers", by R. Kawai, *Chemistry of High Polymers*, (Japan), Volume 13, Page 139 to 147 (1956); and *Properties of Polymers*, by D. W. Van Krevelan Elsevier/North-Holland, Inc., New York, N.Y., Chapter 7, 129 (1976).

Some preferred hydrophobes include: alkyl, cycloalkyl, aryl, alkaryl, aralkyl hydrocarbons having 6 or more carbon atoms; fluoro substituted alkyl, cycloalkyl, aryl, alkaryl and aralkyl having 3 or more carbon atoms and at least one fluorine; and organosiloxane containing organic radicals.

Table I sets forth the calculated molar volumes and solubility parameters for various selected hydrophobes.

TABLE 1

CALCULATED MOLAR VOLUMES AND SOLUBILITY PARAMETERS FOR SELECTED HYDROPHOBES

| HYDROPHOBE | MOLAR VOLUME, cc/mole | SOLUBILITY PARAMETER (cal/cc)$^{\frac{1}{2}}$ |
|---|---|---|
| perfluoroethylmethyl | 78.7 | 6.82 |
| n-pentyl | 83.7 | 8.06 |
| tolyl | 90.1 | 9.04 |
| n-hexyl | 99.2 | 8.12 |
| perfluoropropylmethyl | 104.6 | 6.74 |
| ethylphenyls | 105.6 | 8.95 |
| n-heptyl | 114.7 | 8.17 |
| cumyl | 115.2 | 8.95 |
| n-propylphenyls | 121.2 | 8.89 |
| n-octyl | 130.3 | 8.20 |
| perfluorobutylmethyl | 130.6 | 6.69 |
| n-butylphenyls | 136.7 | 8.84 |
| n-nonyl | 145.8 | 8.23 |
| n-phenylphenyls | 152.3 | 8.80 |
| perfluoropentylmethyl | 156.6 | 6.65 |
| n-decyl | 161.3 | 8.25 |
| isohexylphenyls | 161.8 | 8.63 |
| n-hexylphenyls | 167.8 | 8.77 |
| n-undecyl | 176.9 | 8.27 |
| n-heptylphenyls | 183.4 | 8.74 |
| lauryl | 192.4 | 8.29 |
| n-octylphenyls | 198.9 | 8.72 |
| isononylphenyls | 208.5 | 8.26 |
| n-nonylphenyls | 214.5 | 8.70 |
| n-tetradecyl | 223.5 | 8.31 |
| n-decylphenyls | 230.0 | 8.68 |
| n-undecylphenyls | 245.6 | 8.67 |
| n-hexadecyl | 254.5 | 8.33 |
| isododecylphenyls | 255.1 | 8.34 |
| n-dodecylphenyls | 261.1 | 8.66 |
| stearyl | 285.6 | 8.35 |
| n-tetradecylphenyls | 292.2 | 8.63 |
| n-hexadecylphenyls | 338.9 | 8.62 |
| isooctadecylphenyls | 348.5 | 8.21 |

Molar volume contributions of less than about 70 cubic centimeters per mole are generally undesirable in aqueous applications since dynamic dimer, trimer and tetramer water molecular aggregations (formed by hydrogen bonding of the water molecules) are generally prevalent in such solutions. As such, hydrophobes providing a molar volume contribution of less than about 70 cubic centimeters per mole would not provide a significant difference between the molar volume of the aggregated water molecules and such smaller hydrophobes.

The polymers of the present invention may be structurally defined to include those compounds having the formula:

$$A + B + C)_y]_x \qquad (II)$$

wherein A is a water-soluble polymer segment; B is a connecting segment comprising a covalent bond or a polyvalent organic radical; C is a monovalent hydrophobic group; the number of hydrophobe segments, x, defined by $B(C)_y$, is greater than 0; the number of hydrophobes, C, for each hydrophobic segment, defined as y, is greater than or equal to 1 providing an average of all y values, $\bar{y}$, of greater than 1, i.e., $$\bar{y} \equiv \frac{\sum_{n=1}^{x} y_x}{x} > 1, \qquad (III)$$

such that the polymer has an amount of bunching comprising at least two hydrophobes per hydrophobic segment sufficient to provide for enhanced thickening of aqueous solutions containing the polymer. The y value in Equation II sets forth the number of hydrophobes per hydrophobic segment. The x value sets forth the average number of hydrophobic segments per molecule. Equation III sets forth the requirement for bunching in that the average number of hydrophobes per hydrophobic segment, y, is greater than 1. The average number of hydrophobes per hydrophobic segment, y, is defined as a total number of hydrophobes (i.e., the summation of all hydrophobes per hydrophobic segment, $y_x$), divided by the total number of hydrophobic segments, x.

The connecting segment, B, may be water-soluble or water-insoluble. The hydrophobic segments, $B(C)_p$, may be attached in a pendant fashion to x terminal and/or interior bonds of the water-soluble polymer backbone A; or the connecting segment, B, may be incorporated as part of the polymer backbone between a plurality of water-soluble, polymer segments.

Product Properties

The polymers of this invention have utility in both aqueous and non-aqueous systems. They may be utilized to treat inorganic particulate materials used as fillers and pigments to alter their surface characteristics, thereby enhancing particle wetting when incorporated in a resin system. For example, fillers like silica, zinc oxide, wollastonite, calcium carbonate, glass fibers, clays, molecular sieves, and the like can be suspended more effectively into resin compositions containing a relatively small amount of the polymers of this invention. The polymers of this invention can also be used to treat the surface of these particulate materials before they are supplied or incorporated in a resin composition. If the particulate material which is supplied to the resin has a water-rich layer on its surface, or is hydrated, then it is expected that the water-soluble portion of the polymer of this invention will to some extent dissolve in that layer and thereby provide at least a monolayer of the polymer structure about the particulate material. Consequently, the hydrophobic bunches of the polymer will extend away from the water-rich portion of the surface of the particles and will be incorporated into the resin continuous phase (matrix) of the resin composition to which these particulate materials are added. The advantage in that particular instance is that by wetting the surface with a material which is compatible with that surface, and by providing it with hydrophobic bunches which are readily compatible with the resin to which the particulate material is being incorporated, one is better able to wet the particulate material with the resin to which it is being added, thereby suspending the particulate material in the resin more effectively.

When used in an aqueous solution, the water-soluble, thermoplastic, organic polymer of the present invention is provided in an effective amount to produce thickening of the aqueous solution. An "effective thickening amount" is defined as the quantity of polymer, whether alone or in combination with polymer thickeners of the prior art, required to produce enhanced thickening. Such amount will usually range between about 0.05 to about 10 weight percent, preferably between about 0.1 to about 5 weight percent, and most preferably between about 0.2 to about 2 weight percent of the total composition. Such thickened compositions are useful in a wide variety of applications, such as latex compositions.

In regard to aqueous systems, additional support for the Micellar Bridging theory can be found by comparing the response to added surfactant on the viscosity of solutions of polymers having a single, hydrophobe per segment, as opposed to polymers having bunches of such hydrophobes per segment. As can be seen from Example 51, polymers which contain bunched hydrophobe segments exhibit decreases in viscosity when surfactant compounds are initially added to the solution. The addition of surfactant compounds resulting in a decrease in the solution viscosity of polymers having bunches of hydrophobes is presumably due to the law of mass action in that the added free surfactant competes with other hydrophobes in micelle-like associations. In other words, the added free surfactant will tend to generate non-crosslinking, micelle-like associations with individual hydrophobic segments, thereby suppressing the intermolecular association of two or more hydrophobic segments from different polymers. In contrast, the polymers of the prior art containing single hydrophobes per hydrophobic segment are disclosed as exhibiting initial viscosity increases upon the addition of surfactants, as noted previously. Such increases in viscosity may be attributable to the formation of micelle-like associations wherein the surfactants provide a sufficient mass of monomeric, free surfactant so as to approach the CMC of such a "hydrophobe-poor" polymer solution. Polymers having segments with individual hydrophobes also exhibit a decrease in viscosity once a maximum viscosity has been achieved by adding surfactant. Beyond this maximum the effect of adding more free surfactant overcomes the promotion effect surfactant addition has on the "hydrophobic-poor" polymers of the prior art (i.e., having single hydrophobes in each segment).

Polymer Preparation

The polymers of the present invention are derived from reactions involving water-soluble monomeric or polymeric reactants and hydrophobic reactants, i.e., compounds containing monovalent hydrophobic groups. Optionally, a connecting monomer may also be provided as a linking compound between the water-soluble reactant and the hydrophobic reactant.

The polymers of the present invention may be made by:

(A) bonding the requisite hydrophobes to a water-soluble polymer reactant having a weight average molecular weight of at least about 10,000 containing functional groups available for linking the hydrophobes to the polymer without extending the chain length of the water-soluble portion of the polymer;

(B) reacting condensation monomers and/or prepolymers to form condensation polymers (including the addition of an isocyanate to a functional group containing an active hydrogen), wherein at least one of which contains the requisite hydrophobe component; or (C) reacting olefinically unsaturated monomers and/or prepolymers by addition polymerization, wherein at least one of which contains the requisite hydrophobe component.

The polymer designated (A) above can be any water-soluble, naturally occurring polymer, any water-soluble, modified naturally occuring polymer, or any water-soluble, synthetically produced polymer, such as derived from the prepolymers hereinafter described for (B) and (C).

Illustrative of such naturally occuring polymers are: gelatin, natural gums, casein, starch, alginates, and the like. Modified naturally occurring polymers are the modified cellulosic polymers wherein the modification causes the cellulosic polymer to be water-soluble. Illustrative of such polymers are starch derivatives; the hydroxyethyl cellulosics formed by reacting ethylene oxide with cellulose to a degree sufficient to form a polymer soluble in some proportion in water; water-soluble carboxymethyl cellulose; quaternerized ammonium substituted cellulosics such as Polymer JR, a trademark of Union Carbide Corporation, which is a cellulosic polymer described in U.S. Pat. No. 3,472,840 (Stone et al.), and other such cellulosic derivations. The other naturally occurring polymers may all be oxyethylated by reaction with ethylene oxide, or reacted with other reactants which provide functionality and do not appreciably hinder the intrinsic solubility of the polymers in water.

With respect to the condensation polymers designated (B) above, illustrative examples include condensation polyamides and polyesters, polyethers, polyurethanes, and the like. In this latter regard, the term condensation polymer is defined to encompass not only those polymers formed from monomer molecules which combine with the loss of simple molecules, such as water, but also to include polymers formed by chemical reactions in which the rearrangement of the functional moieties of the monomer molecules during polymerization avoids a loss of a simple molecule.

These polymers are achieved by known condensation reactions by reacting polyfunctional reactants which possess sufficient complimentary functional groups to allow condensation and polymerization. Examples of such functional groups which are considered complimentary for effecting condensation and polymerization are the following:

| Functional Group | Complimentary Functional Group |
|---|---|
| $-NH_2$ | $-N=C=O$ <br> $-COOH$ <br> $-COCl$ |
| $-OH$ <br> $-SH$ | $-CH\underset{\diagdown O \diagup}{-}CH_2$ |
| | $-C-Cl$ (Williamson synthesis) <br> $-COOR°$ <br> (OR° is an ester forming group) |
| | $-CH_2=CH-\overset{O}{\overset{\|}{C}}-$ <br> (Michael Addition) |
| | $-CHO$ <br> $-CH_2OH$ <br> (methylol) |

Obviously, functional group combinations other than those cited above can be appropriately used in the practice of this invention.

The polymers designated (C) above are the product of the reaction of monomeric or prepolymer components interreacting by addition polymerization through olefinically unsaturated double bonds. With respect to the addition polymers, illustrative examples include polyacrylics; such as polyacrylates, polymethacrylates, polyhydroxyethylacrylates and polyacrylamides; polyvinyl compounds; and the like.

The present invention relates to a process for producing a water-soluble, thermoplastic organic polymer having a weight average molecular weight of at least about 10,000, which comprises;

(a) bonding (1) a functional group containing hydrophobic reactants having a hydrophobe bunch of at least two monovalent hydrophobic groups with (2) a water-soluble polymer reactant containing a complementary functional group whereby said hydrophobe bunch is covalently bonded to the polymer; or (b) interreacting (1) a functional hydrophobic reactant having a hydrophobe bunch of at least two monovalent hydrophobic groups with (2) a complementary functional, water-soluble prepolymer or monomer whereby the two are copolymerized to provide a water-soluble polymer containing said hydrophobe bunches; or (c) interreacting (1) a functional hydrophobic reactant having a monovalent hydrophobic group with (2) a complementary functional water-soluble prepolymer whereby the two are copolymerized to provide a water-soluble polymer having at least one hydrophobe bunch containing at least two monovalent hydrophobic groups.

In the broadest sense, the water-soluble, thermoplastic, organic polymers of the present invention may be prepared using either of two basic procedures. In a first embodiment for making condensation polymers (B) or addition polymers (C) as described above, the hydrophobic reactants and water-soluble polymeric or monomeric reactants, and optionally connecting monomers, are reacted either prior to or during the polymerization to form the polymer of the present invention having bunched hydrophobe segments. In a second embodiment for making any of the polymers (A), (B) or (C) above, the water-soluble polymer reactant is a relatively high-molecular weight polymer, having a weight average molecular weight of at least about 10,000. In this embodiment, the water-soluble polymer reactant has a plurality of functional side and/or terminal groups which are reactive with functional groups of monofunctional, polyhydrophobic compounds which allow bonding onto the water-soluble, thermoplastic, organic polymer to provide an amount of hydrophobe bunching sufficient to provide for enhanced thickening of aqueous solutions containing the polymer.

In the first embodiment, a variety of polymerization processes can be utilized in order to produce polymers having bunched hydrophobe segments. One such process which is quite effective, is to preform a polyhydrophobic compound having a bunch of hydrophobes prior to polymerization. In this way, the incorporation of bunched hydrophobe segments is insured. Using such a process, the preforming of the polyhydrophobe reactant can be achieved by reacting hydrophobic reactants containing a hydrophobe together or with a connecting monomer to produce a polyhydrophobic reactant having bunched hydrophobe segments. These polyhydrophobic reactants can then be polymerized with a water-soluble polymeric or monomeric reactant to provide a water-soluble, thermoplastic, organic polymer having a weight average molecular weight of at least about 10,000.

A second polymerization process relies upon the kinetics of the polymerization reaction to provide formation of bunched hydrophobe segments. By providing a difunctional, connecting monomer having functional moieties which selectively polymerize with the functional moieties of the hydrophobic reactant, even in the presence of the water-soluble polymer reactant (having functional moieties less reactive with the connecting monomer), bunched hydrophobe segments can be formed initially, followed by extension of the polymer with the water-soluble polymer reactant. For example, a urethane based polymer can be derived from a polyoxyethylene glycol as the water-soluble polymer reactant, a diisocyanate as the connecting monomer, and a hydrophobic diamine as the hydrophobic reactant. Since amines will generally react with isocyanates much faster than alcohols, the addition of a diisocyanate to a solution of the polyoxyethylene glycol and hydrophobic diamine would result in bunching of the hydrophobic diamine followed by polymer growth incorporating the polyether glycol.

A third polymerization process involves making a prepolymer of the water-soluble polymer segment and joining such prepolymers with an equivalent or larger molar amount of hydrophobic compounds having single hydrophobic groups. Using such a process, the formation of bunched hydrophobe segments is insured on the basis of statistical considerations. As the molar ratio of hydrophobic reactants to prepolymer is increased, the number of hydrophobes per bunch is correspondingly increased.

Conceivably, variations of these procedures for achieving hydrophobe bunch formation, although much less effective, may be to (1) graft a large molar amount of hydrophobic reactant having a single hydrophobe in a random fashion to a preformed, water-soluble backbone or alternatively (2) copolymerize an excessive molar amount of hydrophobic reactant having a single hydrophobe with low-molecular weight water-soluble monomers. If enough hydrophobic reactant is added, bunching might result. A drawback to these procedures is that the amount of hydrophobic reactants required to achieve a substantial degree of bunching would severely limit the water-solubility of the polymer and its ability to form intermolecular, micelle-like associations.

As described for either basic procedure above, the incorporation of hydrophobe bunches into such polymers, be they polymers (A), (B), or (C), can be effected by the production of bunched hydrophobes associated within polyhydrophobic compounds having the needed functional group enabling the bunched hydrophobes to be introduced into and made a part of the polymer structure. This is illustrated by the following and in the examples, which, illustrations are not intended to limit the scope of this invention. In the illustrations, R represents a monovalent hydrophobic group as encompassed by this invention.

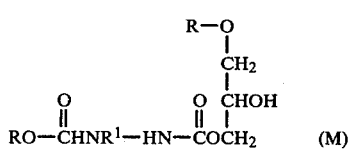

["M" is formed by the following sequence of reactions:

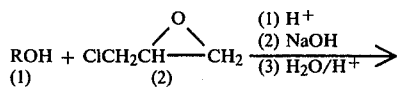

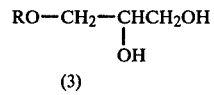

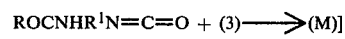

wherein, $R^1$ is any divalent organic radical joined to two (2) isocyanato groups forming a connecting monomer as defined below, such as 2,4 and/or 2,6-toluene diisocyanates, 1,4-tetramethylene diisocyanate, 1,6-hexamethylene-diisocyanate, bis(4-isocyanatophenyl)methane, the norbornyl diisocyanates, and the like. Other useful diisocyanates are discussed below.

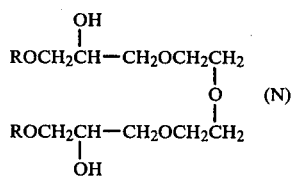

["(N)" can be formed by the following sequence of reactions:

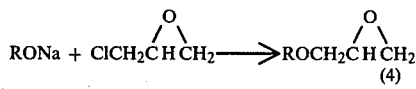

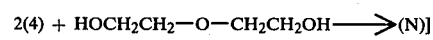

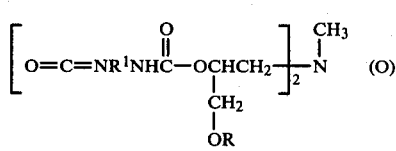

["(O)" can be formed by the following sequence of reactions:

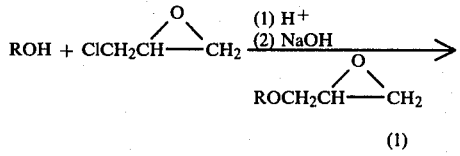

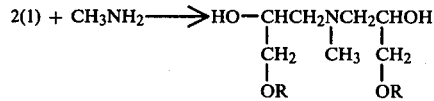

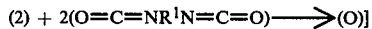

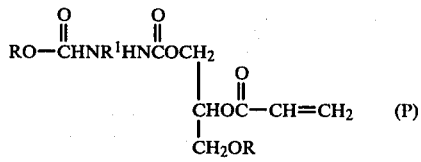

["(P)" can be formed by reacting acryloyl chloride with "(M)" above]

-continued

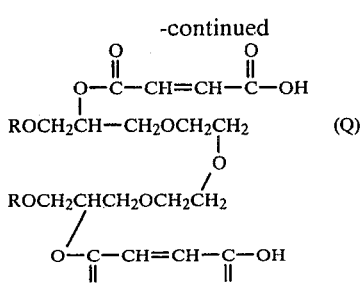
(Q)

["(Q)" is formed by reacting maleic anhydride with "(N)" above]

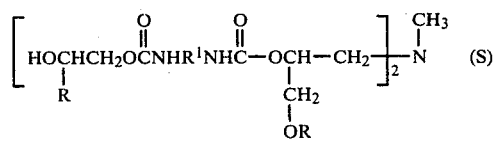
(S)

["(S)" can be formed by reacting one mole of "(O)" above with two moles of $RCH-CH_2]$
                                                              | |
                                                              OH OH

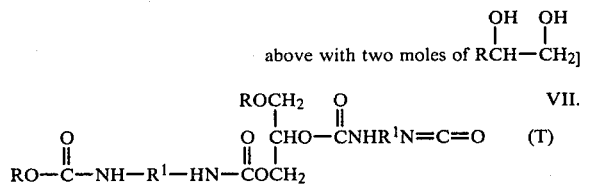
(T)

["(T)" can be formed by reacting 1 mole of "(M)" above with 1 mole of a diisocyanate]

The polymers of the present invention contain hydrophobes derived from hydrophobic reactants which may be reacted directly, or through a connecting monomer, with the water-soluble polymer reactants or may be bonded onto a water-soluble polymer backbone or a side group attached to the backbone. The hydrophobic reactants contain at least one monovalent hydrophobic group, or in a preferred embodiment, comprise polyhydrophobic compounds containing a plurality of monovalent hydrophobic groups. The hydrophobic compounds may be monofunctional or difunctional depending upon the reactive process required to chemically bond the hydrophobic reactants to the water-soluble reactant or to the connecting monomer.

Some of the specific examples of preferred hydrophobic reactants which can be used to form bunches of hydrophobes that can be incorporated into the polymer either pendantly or integrally under the appropriate reaction conditions or sequence of reactions are (1) 1,2 epoxides, such as 1,2-octeneoxide, 1,2 dodeceneoxide, 1,2 hexadeceneoxide and 1,2 octadeceneoxide; (2) alkyl or isoalkyl 1,2 and 1,3 diols, such as: 1,2-octanediol; 1,2-decanediol; 1,2-dodecanediol; 1,2-tetradecanediol; 1,2-hexadecanediol; 1,2-octadecanediol; 1,2-eicosanediol; 1,3-nonanediol; 1H, 1H, 2H, 3H, 3H-perfluorononane-1,2-diol; the reaction product of diethylene glycol and an alkyleneoxide such as 1,2-octeneoxide, 1,2-dodeceneoxide, 1,2-hexadeceneoxide, and 1,2-octadeceneoxide, 1H, 1H, 2H, 3H, 3H-perfluorononyleneoxide; the reaction product of lauryl or cetyl alcohols and 1,2-dodeceneoxide or 1,2 hexadeceneoxide; and polyoxyalkylated reaction products of the foregoing compounds; (3) hydroxyamines, such as: di(hydroxyethyl) dodecyl amine; di(hydroxyethyl) hexadecyl amine; polyoxyethyl dodecyl amine; polyoxyethyl hexadecylamine, 1-amino-2-hydroxydodecane; 1-amino-2-hydroxytetradecane; and 1-(N-dodecylamino)-2-hydroxytetradecane; (4) alkenes, such as: 1-dodecene; 1-tetradecene; and 1-hexadecene; (5) diamines, such as: 1,2-diaminodecane; and (6) dicarboxylic acids, such as laurylmalonic acid and octylsuccinic acid.

Most preferred hydrophobic reactants include alkyls having at least about 6 carbon atoms. Preferred polyhydrophobic compounds include polyether alcohols. A particularly preferred hydrophobic compound is 1,2-hexadecanediol.

The amount of hydrophobic compound which can be added to produce the hydrophobes on the water-soluble polymers may range from about 0.01 to about 10 weight %, more preferably about 0.1 to about 5 weight %, and most preferably from about 0.5 to about 2.5 weight % of the total polymer product.

With respect to the polymer reactants designated (A), the polyhydrophobic compounds may be coupled to such polymer reactants through a functional group along the polymer. The functional groups of the water-soluble polymer reactants contain moieties which provide the reactivity required to chemically bond the water-soluble polymer reactant to the hydrophobic reactants. Such moieties can be either active hydrogen e.g. hydroxyl, sulfhydryl, amino and the like or the corresponding complementary functionality of isocyanate, carboxylate, anhydride and the like. In the case where the reactants of the water-soluble polymer reactant and the hydrophobe reactant are identical, a connecting monomer of the corresponding complementary type may be used to bind the hydrophobe to the water-soluble polymer.

Other examples of such functional groups include, but are not limited to: hydroxyls, sulfhydryls, aminos, ethylenic unsaturations, epoxides, carboxylic acids, carboxylic esters, carboxylic acid halides, amides, phosphates, sulfonates, sulfonyl halides, organic silanes, acetylenes, phenols, cyclic carbonates, isocyanates and carbodiimides. The coupling of such polyhydrophobic compounds to the polymer through such active hydrogens can be achieved by reactions in which such active hydrogens participate, such as the functional condensation groups depicted above.

For example, hydroxyethylcellulose, polyvinyl alcohol or polyacrylamides, can have bunched hydrophobe substitution introduced therein by reacting functional hydroxyethyl, hydroxyl or amino groups, respectively on these polymer with a complimentary functional polyhydrophobic compound such as (T) above. Obviously, many other kinds of complimentary functional compounds containing bunched hydrophobes within the contemplation of this invention will be apparent to these skilled in the art.

With respect to the polymer reactants designated (B), the hydrophobe containing reactant is typically polyfunctional, preferably difunctional, so as to assure the formation of a thermoplastic polymer. The examples amplify the kinds of such compounds one may employ. Obviously, many other kinds of complimentary difunctional compounds containing bunched hydrophobes within the contemplation of this invention will be apparent to those skilled in the art.

In a preferred embodiment, a connecting monomer is also provided as a linking compound between the water-soluble polymer reactant and a hydrophobe reactant having a monovalent hydrophobic group. The connecting monomer is preferably difunctional, having at least two terminal functional groups which provide the reactivity required to chemically bond to the hydrophobic reactants and to the water-soluble polymer reactant.

The amount of connecting monomers which can be reacted to a water-soluble reactant or hydrophobic reactants may range from about 0.1 to about 10 weight %, more preferably from about 0.5 to about 7 weight %, most preferably from 1.5 to about 4 weight % of the total polymer product.

The connecting monomer is preferably a diisocyanate compound having structure:

$$O=C=N-R^1-N=C=O \quad (V)$$

wherein $R^1$ is an alkylene, cycloalkylene or arylene, either unsubstituted or substituted with groups, such as halo, alkyl and/or aryl. Some representative examples of such compounds include:

2,6- and 2,4-tolylene diisocyanate (i.e., toluene diisocyanate); bis(4-isocyanatophenyl)methane (i.e. methylene dianiline diisocyanate); 1-isocyanato-3-isocyanatomethyl-3,5,5-trimethylcyclohexane (i.e. isophorone diisocyanate); 1,4-tetramethylene diisocyanate; 1,6-hexamethylene diisocyanate; 2,2,4-trimethyl-1,6,diisocyanatohexane; 1,10-decamethylene diisocyanate; 1,4-cyclohexylene diisocyanate; bis(4-isocyanatocyclohexyl)methane; m- and p-phenylene diisocyanate; 4-chloro-1,3-phenylene diisocyanate; 1,5-naphthalene diisocyanate; 1,5-tetrahydronaphthalene diisocyanate; and mixtures thereof. Preferred diisocyanates include toluene diisocyanate, isophorone diisocyanate and methylene dianiline diisocynanate.

The hydrophobic reactant's functionality will be complimentary to those of the other reactants, as set forth above, to produce the desired water-soluble polymer. Preferred functional groups include diols for hydrophobic compounds and diisocyanates for connecting monomers. In making such polymers water-soluble, the complimentary reactants should contain polar groups which are not functional groups participating in the condensation reaction to provide sufficient water-solubility in the polymer. When the polymer is formed the polymer will either possess the desired water-solubility or can be rendered water-soluble by ionization or by grafting polar groups such as methylol or hydroxyethyl groups to active hydrogen containing moieties existing along the polymer chain. In the preferred case, at least one of the complimentary reactants, i.e., the water-soluble polymer reactant, used to form the polymer contains sufficient repeating oxyethylene groups or aminoethyl groups to render the resulting polymer water-soluble, even though the polymer contains the bunched hydrophobe content of this invention.

An illustrative portion of the condensation polymer designated (B) is:

$$[-X-Y-Z-] \quad (VI)$$

wherein (1) X is a divalent radical derived from a water-soluble polymer reactant having the following struture: a-$R^2$-a, in which a is one of the functional groups listed above and $R^2$ is a divalent radical such as:

—(CH$_2$CH$_2$O)$_x$—CH$_2$CH$_2$—,

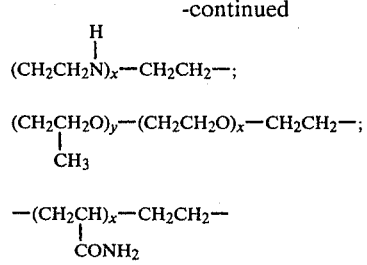

in which x is an integer large enough to cause the resulting polymer to possess water-solubility and y is an integer less than x;

(2) Y is a divalent radical derived from a connecting monomer having the following structure: b-$R^3$-b, in which b is one of the functional groups listed above as being complimentary functional, and $R^3$ is any divalent organic radical which with the composition of $R^2$ and Z provides for the desired water-solubility; and (3) Z is a divalent radical derived from a hydrophobic reactant having the following choice of structures: a-$R^4$-a and/or b-$R^4$-b, in which $R^4$ contains at least one hydrophobe containing moiety; a and b are as defined above, and the selection of each is predicated upon the stoichiometric ratio of a to b in order to achieve the desired molecular weight for the polymer and to insure the incorporation of bunched hydrophobes of Z into the polymeric structure. When $R^4$ contains only one hydrophobe, the selective reactivity between Y and Z and the size of Y should be sufficient to provide for bunching of hydrophobes in Z. In other words Y should be sufficiently small and should separate at least two hydrophobes in the Z radicals to provide the hydrophobes in sufficient proximity or close association to produce micellar-like associations resulting in enhanced thickening of aqueous solutions containing such polymers.

A preferred class of water-soluble polymers includes polyether polyurethanes. Such polymers may be derived from reacting a polyether diol as a difunctional, water-soluble polymer reactant; a diisocyanate as a difunctional, connecting monomer; and a dihydroxy, nonionic hydrophobic compound as a difunctional hydrophobic reactant having a monovalent hydrophobic group.

In particular, the polyether diol is preferably a divalent, nonionic, hydrophilic polyether group having a molecular weight of from about 600 to about 50,000, preferably from about 1,000 to about 14,000. Such compounds include homopolymers and copolymers of ethylene oxide and other lower alkylene oxides.

With respect to the polymers designated (C), polymeric formation follows the rules for polymers (B) above, i.e., the reactants are selected to yield a polymer which is water-soluble and which contains the requisite bunched hydrophobes. The polymerization of the olefinically unsaturated monomers which make up polymer (C) may be acheived by any of the known addition polymerizations such as free-radical, anionic, cationic, or metal coordination methods. The polymerization may be effected interfacially, in solution, emulsion, suspension, and the like. In the typical case the polymerization will utilize at least two (2) copolymerizable components, one of which provides the water-solubility to the polymer (either as a result of copolymerization or as a result of treatment after copolymerization), and the other of which provides the desired bunched hydrophobe content in the polymer.

Illustrative of such water-solubilizing components are the following:

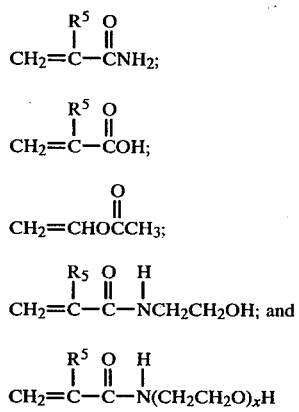

wherein $R^5$ is $CH_3$— or H— and x is as previously defined in $R^2$ above. The third example of vinylacetate would require hydrolysis of the acetyl group to produce sufficient vinyl alcohol moieties to be water-soluble.

Obviously, other water solubilizing components will become apparent to those skilled in the chemical arts. Illustrative of olefinically unsaturated components containing bunched hydrophobes include (P) and (Q) above. Third and fourth olefinically unsaturated monomeric components can be included in making the polymer (C) structure, such as vinyl acetate (not later hydrolyzed), vinyl propionate, vinyl butyate, styrene, alpha-methyl styrene, maleic anhydride, fumaric acid, methyl fumarate, p-chloro-styrene, methyl acrylate, methyl methacrylate, 1-hydroxy propyl acrylate, 2-hydroxyethyl acrylate, and the like.

Relative molar amounts of water-soluble polymer reactants, hydrophobic reactants and connecting monomers may vary depending upon the reaction process used to achieve bunching of hydrophobes. Bonding of monofunctional, polyhydrophobic reactants into polyfunctional water-soluble polymer reactants having a plurality of functional side groups, will be conducted with an amount sufficient to produce polymers having bunched hydrophobe segments providing for enhanced thickening of aqueous solutions containing such polymers. The molar ratio of monofunctional, polyhydrophobic reactant to the water-soluble polymer reactant will preferably be from about 0.25:1 up to about 6:1. Molar ratios for copolymerising water-soluble polymer reactants, connecting monomers and hydrophobic reactants, will preferably range from about 2:3:1 up to about 16:21:6 respectively.

With respect to the preferred polyether polyurethanes of the present invention, segments of bunched hydrophobes can be produced using any of several step growth polymerization procedures. One procedure involves preparing a water-soluble polymer reactant from a polyether diol and a portion of diisocyanate connecting monomer. When this reaction is complete, the required amounts of the hydrophobic reactant and a second portion of the diisocyanate connecting monomer are added in order to achieve the desired bunching and molecular weight extension. An alternative procedure involves making a polyhydrophobic reactant by reacting a hydrophobic diol reactant with a diisocyanate connecting monomer, followed by extension with the required amounts of water-soluble polyether diol reactant and a second portion of diisocyanate connecting monomer. Of these two procedures, the former is preferred because water, which is absorbed by the polyether diol, can be easily removed by azeotropic distillation if a suitable solvent, such as benzene, toulene, or xylene, is used. Alternative preferred embodiments include preforming the polyhydrophobic bunches in a polyether diol, such as the product formed by reacting diethylene diol and alpha-olefin epoxide, or preforming higher ethyoxylates of such compounds. It is preferred that the overall isocyanate/active hydrogen ratio of these step growth polyether polyurethanes be less than or equal to one in order to avoid undesirable side reactions.

Additional preferred embodiments of the present invention include modification of water-soluble polymers disclosed in the prior art, such as random comb polymers and hydrophobe capped polymers, by substituting bunches of hydrophobe segments in place of some or all of the individual hydrophobes which have been utilized previously. Such hydrophobe bunching of prior art polymers can be achieved by providing the water-soluble polymer of the prior art with a plurality of functional side groups in place of the single, hydrophobic groups described for such polymers. These water-soluble polymer reactants may then be reacted with monofunctional, polyhydrophobic reactants to provide a water-soluble, thermoplastic, organic polymer having bunched hydrophobe segments. The monofunctional, polyhydrophobic reactant may be derived as disclosed previously.

The temperature during the polymerization reaction may vary depending upon the particular type of polymers being produced. For the preferred polyether polyurethanes, a convenient range is from about 40° C. to about 120° C., preferably from about 60° C. to about 110° C. The reaction temperature should be selected to obtain a reasonably fast reaction rate while avoiding undesirable side reactions, such as allophonate formation. The water-soluble, thermoplastic, organic polymer product may be isolated from the reaction medium by procedures well established in the art, including evaporation, distillation, precipitation, filtration and other isolation procedures.

In a typical embodiment, a round bottom reaction flask equipped with a mechanical stirrer, a thermometer, a condenser and a nitrogen purge is charged with the polyether diol and toulene solvent. The mixture is brought to reflux to azeotropically remove residual water and then cooled to 60° C. for approximately 24 hours. The hydrophobic compound and second portion of diisocyanate are then added and stirring continued for another day. The product can then be isolated through the evaporation of the toluene solvent at atmospheric conditions.

Adjuvants

Suitable adjuvants may be provided during the formation of water-soluble, thermoplastic, organic polymers of the present invention including solvents and catalysts well known to those skilled in the art.

In general catalysts are chosen which enhance the type of chemistry employed to produce the polymers of this invention.

The free radical addition polymerization method can be accomplished by either thermally generated free radicals or by use of a redox system. Frequently employed free radical catalysts include persulfates, perphosphates, perborates, hydrogen peroxide, organic acyl peroxides, organic diacyl peroxides, organic hydroperoxides and organic azo compounds, and the like. In redox systems the reductants may be sulfites, sodium formaldehyde sulfoxylate, ascorbic acid, and the like; trace amounts of polyvalent metal ions, such as $Fe^{++}$, ion can be used to further activate the catalyst in these systems. In addition chain transfer agents such as mercaptans may be used to regulate the molecular weight and molecular weight distribution of the final polymer.

In the condensation polymerization method catalysts are again chosen based on the type of chemistry being employed. Thus, for polyesters made by direct esterification the well known acid or base catalysts may suffice, while for transesterification metal alkoxides or organic metal salts such as alkyl titanates, aluminates, stannates, plumbates, and the like may be used.

In preparing the preferred polyether polyurethanes, the polymerization reaction is usually conducted neat or in an aprotic solvent such as toluene or other well known urethane polymerization solvents. Typical catalysts include soluble heavy metal carboxylates such as phenyl mercuric acetate, bismuth octanoate, dibutyltin dilaurate, and stannous octanoate; tertiary amines such as bis[2-(N,N-dimethylamino) ethyl ether], triethylamine and triethylenediamine or any other acidic or basic catalyst well known in the urethane art. A particularly preferred catalyst is dibutyltin dilaurate.

EXAMPLES

Viscosities of these aqueous solutions were measured on a Brookfield RVT viscometer at 5 rpm using standard procedures well known to those skilled in the art.

The chemical designations used in the examples are defined as follows:

| Designation | Description |
|---|---|
| DBTDL | dibutyltin dilaurate |
| DMDPD | 3,3'-dimethyl-4,4'-diphenyl diisocyanate |
| $H_{12}MDI$ | 4,4'-methylene bis(isocyanatocyclohexane) |
| IPDI | isophorone diisocyanate |
| PEG | polyethylene glycol |
| PMA | phenylmercuric acetate |
| SMA | styrene/maleic anhydride copolymer having a molecular weight of about 50,000 |
| TDI | toluene diisocyanate |

Comparative Analysis

EXAMPLES 1-8

Example 1 sets forth the preparation of a preferred hydrophobic compound. Examples 2 and 3 set forth the preparation of polymers having single hydrophobes randomly located for comparative analysis. Examples 4-7 set forth the preparation of polymers of the invention having segments of bunched hydrophobes. Example 8 sets forth the properties of a standard thickening agent, hydroxyethyl cellulose for comparison. Table 2 summarizes the compositions and Brookfield viscosities of 2% water solutions of the various polymers.

A comparison between polymers having single hydrophobes randomly located versus bunched hydrophobes for similar compositions, i.e., Example 2 with Examples 4 and 5, as well as Example 3 with Examples 6 and 7, can be made. Greater viscosities are exhibited for the polymers having segments of bunched hydrophobes, than the corresponding polymers having a random configuration of single hydrophobes.

EXAMPLE 1

A four-necked round bottom flask equipped with a mechanical stirrer, a thermometer, an addition funnel, a condenser, and a nitrogen purge was charged with 646 g (1.0 mole) of a 10 mole ethylene oxide adduct of nonyl phenol and purged with nitrogen. Stannic chloride, 10 g, was added dropwise with stirring under a nitrogen blanket. Stirring was continued for ½ hour and then 102 g (1.1 moles) of epichlorohydrin was added at a rate slow enough to prevent the exotherm from exceeding 60° C. When the addition was complete the temperature was brought to 60° C. and the reaction was allowed to stir overnight. The reaction mixture was cooled below 30° C. and 96 g of a 50% aqueous sodium hydroxide solution was added at a rate that kept the reaction temperature below 30° C. The mixture was stirred an additional 3 hours. Isopropanol was added and the reaction mixture was stripped thoroughly and filtered (oxirane oxygen content=2.11%). A 500 g portion of this reaction product and 300 g of glyme was charged to a four-necked round bottom flask equipped with a mechanical stirrer, a thermometer, a condenser, an addition funnel, and a nitrogen purge and purged with nitrogen. A solution containing 25 g of sulfuric acid and 225 g of water was added slowly with stirring. The reaction mixture was brought to reflux and kept at reflux overnight. The acid was neutralized with 41.2 g of a 50% aqueous sodium hydroxide solution. The reaction mixture was stripped thoroughly and filtered to give a product having a hydroxyl number of 154 and a vicinal diol content of 83%.

EXAMPLES 2-3: RANDOM POLYMERIZATION

EXAMPLE 2

A four-necked round bottom flask equipped with a mechanical stirrer, a thermometer, a Dean-Stark trap with a condenser, and a nitrogen purge was charged with 285 g of PEG having a molecular weight of about 8000, 15 g of the hydrophobic compound prepared in Example 1, and 1000 g of toluene. The mixture was brought to reflux to azeotropically remove any water present. The mixture was cooled to 60° C. and 0.25 g of dibutyltin dilaurate was added followed by 9.9 g of toluene diisocyanate. The reaction mixture became very viscous in a few hours. After stirring at 60° C. for approximately 4 days the reaction mixture was poured into shallow pans to allow the toluene to evaporate at atmospheric conditions.

EXAMPLE 3

Using the same procedure described in Example 2 a polymer having randomly located single hydrophobes was prepared using the amounts of reactants set forth in Table 2.

EXAMPLES 4-7: BUNCHING POLYMERIZATION

EXAMPLE 4

A four-necked round bottom flask equipped as described in Example 2 was charged with 285 g of 8000 molecular weight PEG and 1000 g of toluene. This mixture was brought to reflux to azeotropically remove any water present. The mixture was then cooled to 60° C. and 0.25 g of dibutyltin dilaurate and 5.4 g of toluene diisocyanate were added. The reaction was stirred overnight at 60° C. and then 15 g of the hydrophobic compound from Example 1, 200 ml of toluene and 4.5 g of toluene diisocyanate were added. After stirring an additional 2 days at 60° C. the reaction mixture was poured into shallow pans to allow the toluene to evaporate at atmospheric conditions.

EXAMPLES 5-7

Using the same procedure described in Example 4 a polymer having segments containing bunched hydrophobes was prepared using the amounts of reactants set forth in Table 2.

TABLE 2

| Example No. | Polymer Configuration | Weights (G) | | | | Composition (wt. %) | | | Viscosity |
|---|---|---|---|---|---|---|---|---|---|
| | | PEG | 1st TDI | Diol | 2nd TDI | PEG | Diol | TDI | |
| 2 | Random | 285 | — | 15 | 9.9 | 91.8 | 4.8 | 3.4 | 44 |
| 3 | Random | 270 | — | 30 | 13.1 | 86.2 | 9.6 | 4.2 | 1100 |
| 4 | Bunched | 285 | 5.4 | 15 | 4.5 | 91.8 | 4.8 | 3.4 | 1900 |
| 5 | Bunched | 285 | 5.9 | 15 | 4.0 | 91.8 | 4.8 | 3.4 | 184 |
| 6 | Bunched | 270 | 5.1 | 30 | 8.0 | 86.2 | 9.6 | 4.2 | 1940 |
| 7 | Bunched | 270 | 5.6 | 30 | 7.5 | 86.2 | 9.6 | 4.2 | 1540 |
| 8 | Hydroxethyl cellulose | | | | | | | | 25000 |

Preparation of Hydrophobic Compounds

EXAMPLE 9

Preparation of 1,2-hexadecanediol

A 3000 ml 4-neck round bottom flask equipped with a mechanical stirrer, heating mantle, thermometer, and condenser was charged with 480 g (2 moles) $C_{16}$ α-olefin epoxide, 1000 g glyme, 400 g water, and 8 g sulfuric acid. The mixture was brought to reflux with stirring and maintained at reflux for approximately 16 hours. The reaction mixture was cooled below reflux temperature and the sulfuric acid was neutralized with 13 g of 50% sodium hydroxide solution. Glyme and the bulk of the water was removed by distillation. Residual water was removed by azeotroping with excess toluene. The hot toluene solution was filtered to remove the insoluble salt and diluted with toluene to a volume of about 3.5 liters. The crystals that separated on standing at room temperature were collected by filtration and air dried to provide 332 g of a waxy powder having a melting point of 76°-77° C.

EXAMPLE 10

Preparation of 1H,1H,2H,3H,3H-perfluorononane-1,2-diol

This product is prepared from 1H,1H,2H,3H,3H-perfluorononyleneoxide in a manner analogous to that used for the preparation of 1,2-hexadecanediol in Example 9. The product was a white, waxy, crystalline material having a melting point of 65°-66° C.

EXAMPLES 11-16

PREPARATION OF POLYHYDROPHOBIC DIOLS

A 500 ml 4-neck round bottom flask equipped with a mechanical stirrer, heating mantle, thermometer, condenser, and $N_2$ purge is charged with diethylene glycol and boron trifluoride etherate catalyst (approximately 1% of total reaction mixture). The mixture is heated to 75°-80° C. and the hydrophobic epoxide is added at a rate such that a reaction temperature of 75°-80° C. can be maintained without external heating. The reaction is then kept at 75°-80° C. for one hour after addition of the epoxide is complete and then stripped at 10-20 mm of mercury. Table 3 sets forth the type of epoxide used along with the quantities of reactants for each example.

TABLE 3

| Example | Diethylene Glycol, moles | Hydrophobic Epoxide | Hydrophobic Epoxide, moles |
|---|---|---|---|
| 11 | 1 | $C_{12}$ α-olefin epoxide | 3 |
| 12 | 1 | $C_{20}$ α-olefin epoxide | 3 |
| 13 | 1 | $C_{24-28}$ α-olefin epoxide | 3 |
| 14 | 1 | $C_{16}$ α-olefin epoxide | 2 |
| 15 | 1 | $C_{16}$ α-olefin epoxide | 3 |
| 16 | 1 | $C_{10}$ α-olefin epoxide | 4 |

EXAMPLES 17-19

PREPARATION OF ETHOXYLATED POLYHYDROPHOBIC DIOLS

A 4-neck round bottom flask equipped with a mechanical stirrer, a pressure equalizing addition funnel, a distillation head with a condenser, and a nitrogen sparge is charged with the polyhydrophobic diol and heated to 60°-80° C. A methanolic solution of potassium hydroxide (approximately 20 mole % KOH based on polyhydrophobic alcohol) is added slowly and the methanol is taken off overhead. When addition of the potassium hydroxide solution is complete the reaction temperature is raised to approximately 100° C. and the pressure reduced to 5-10 mm of mercury while maintaining a continuous flow of nitrogen. This temperature and pressure is maintained for 1-2 hours to remove traces of methanol and water. The mixture is then cooled to 60°-80° C. This molten mixture is charged to a Parr pressure bomb equipped with a mechanical stirrer, a feed pump and appropriate temperature and pressure control devices. The reaction system is brought to 100°-120° C. under 20 pounds of nitrogen and the desired amount of ethylene oxide is added over a period of time. Depending on the desired molecular weight the reaction may be conducted in two stages, by dumping a portion of the first stage and continuing the addition of ethylene oxide. When all of the ethylene oxide has been added the reaction is heated for an additional 1-2 hours at 100°-120° C. The molten product is then treated with magnesium silicate and filtered. The molecular weights are given in Table 4.

TABLE 4

| Example | Polyhydro-phobic Diol | Molecular Weight of Product |
|---------|------------------------|------------------------------|
| 17 | Example 14 | 7030 |
| 18 | Example 15 | 6720 |
| 19 | Example 16 | 7810 |

EXAMPLE 20

PREPARATION OF A POLYHYDROPHOBIC ALCOHOL

Polyhydrophobic alcohols can be prepared in a manner analogous to that described for polyhydrophobic diols except that an active hydrogen compound having a single active hydrogen is substituted for diethylene glycol. In this example two moles of $C_{16}\alpha$-olefin epoxide are added to one mole of cetyl alcohol with boron trifluoride as catalyst to yield a trihydrophobic alcohol.

EXAMPLES 21-22

PREPARATION OF ETHOXYLATED POLYHYDROPHOBIC ALCOHOLS

These products are prepared from polyhydrophobic alcohols in a manner anologous to that described for ethoxylated polyhydrophobic diols. The polyhydrophobic alcohol and the molecular weight of the product are given in Table 5.

TABLE 5

| Example | Polyhydro-phobic Diol | Molecular Weight of Product |
|---------|------------------------|------------------------------|
| 21 | Cetyl Alcohol | 2000 |
| 22 | Example 20 | 2200 |

Preparation of Polymers with Bunched Hydrophobes

EXAMPLES 23-33

I. PREPARATION OF AQUEOUS SOLUTIONS OF POLYMERS

A. The appropriate quantities of the polymer and water are weighed into a wide mouth jar. The jar is sealed and allowed to roll on a roll mill until solution is complete. Alternatively the polymer can be dissolved by stirring the mixture with a mechanical stirrer until solution is complete.

B. A 15-30% mixture of polymer in a mixture of 20 parts diethylene glycol monobutyl ether and 80 parts of water is prepared by stirring or rolling on a roll mill the appropriate amounts of polymer, diethylene glycol monobutyl ether and water. Aqueous solutions of lower concentrations are obtained by diluting the 15-30% mixture with water.

II. PREPARATION OF POLYMERS FROM 1,2 DIOLS

A 4-neck round bottom flask equipped with a mechanical stirrer, a thermometer, a nitrogen purge and a Dean Stark trap with a condenser is charged with the polyether and enough toluene to afford a 20-30% solution of the final polymer. The mixture is brought to reflux to remove water azeotropically and then cooled to 60°-85° C. The catalyst (0.1-0.4% based on weight of final polymer) is added followed by the first portion of the diisocyanate. Stirring is continued at 60°-85° C. for 3-24 hours. The hydrophobic diol is added followed by the second portion of the diisocyanate and the reaction is stirred at 60°-85° C. for an additional 3-24 hours. The viscous product is poured into shallow pans to evaporate the toluene solvnet at atmospheric conditions.

The reactant materials are listed in Table 6 according to the molar quantities of the polyethylene glycol polyether, diisocyanate, in two additions, and hyrophobic diol. The structure of the polymer product is set forth using average values of the parameters in Equation II.

The amount of hydrophobes per bunch, defined by the value of y, that provides the optimum thickening efficiency can be calculated from the y values and 2% aqueous viscosities presented in Examples 23 through 26. Regression of this data provides the equation:

$$\log \eta_{2\%} = -0.571 + 3.44y - 0.505y^2$$

having an $R^2$ value of 0.98. Differentiating the equation, setting $d \log \eta_{2\%}/dy = 0$, and solving for y shows that the optimum value for y within this series of data is 3.4.

TABLE 6

| | Composition | | | | | | | |
|---|---|---|---|---|---|---|---|---|
| | Materials | | | | Molar Ratio | | | |
| Example | PEG, mol. wt. | Diisocyanate | Diol | Catalyst | PEG | Diisocyanate | Diol | Diisocyanate |
| 23 | 8000 | TDI | Example #9 | DBTDL | 81 | 72 | 11 | 19 |
| 24 | 8000 | TDI | Example #9 | DBTDL | 42 | 36 | 15 | 20 |
| 25 | 8000 | TDI | Example #9 | DBTDL | 81 | 72 | 31 | 39 |
| 26 | 8000 | TDI | Example #9 | DBTDL | 42 | 36 | 29 | 34 |
| 27 | 8000 | TDI | Example #9 | DBTDL | 15 | 12 | 13 | 15 |
| 28 | 8000 | TDI | Example #9 | DBTDL | 27 | 24 | 13 | 15 |
| 29 | 8000 | TDI | Example #9 | DBTDL | 45 | 36 | 31 | 39 |
| 30 | 8000 | TDI | 1,2-Octanediol | DBTDL | 42 | 36 | 29 | 34 |
| 31 | 8000 | IPDI | Example #10 | PMA | 42 | 36 | 15 | 20 |
| 32 | 14,000 | $H_{12}MDI$ | Example #9 | PMA | 15 | 12 | 5 | 7 |
| 33 | 14,000 | DMDPD | Example #9 | PMA | 15 | 12 | 5 | 7 |

| | | | | | | Aqueous Viscosity | |
|---|---|---|---|---|---|---|---|
| Example | A | $B^a$ | C | $\bar{y}$ | x | Method | 2% |
| 23 | 9 —(TDI—PEG)$_9$—TDI— | 0.1 | n-$C_{14}H_{29}$— | 1.1 | 10 | A | 384 |
| 24 | 6 —(TDI—PEG)$_7$—TDI— | 1.14 | n-$C_{14}H_{29}$— | 2.14 | 7 | A | 54,000 |
| 25 | 9 —(TDI—PEG)$_9$—TDI— | 2.10 | n-$C_{14}H_{29}$— | 3.10 | 10 | A | 117,000 |
| 26 | 6 —(TDI—PEG)$_7$—TDI— | 3.14 | n-$C_{14}H_{29}$— | 4.14 | 7 | A | 130,000 |
| 27 | 3 —(TDI—PEG)$_5$—TDI— | 2.25 | n-$C_{14}H_{29}$— | 3.25 | 4 | A | 95,000 |

| | | | | | | | | |
|---|---|---|---|---|---|---|---|---|
| 28 | 3 —(TDI—PEG)$_9$—TDI— | | 2.25 | n-C$_{14}$H$_{29}$— | 3.25 | 4 | A | 120,000 |
| 29 | 9 —(TDI—PEG)$_5$—TDI— | | 2.10 | n-C$_{14}$H$_{29}$— | 3.10 | 10 | A | 98,000 |
| 30 | 6 —(TDI—PEG)$_7$—TDI— | | 3.14 | n-C$_6$H$_{13}$— | 4.14 | 7 | A | 96 |
| 31 | 6 —(IPDI—PEG)$_7$—IPDI— | | 1.14 | CF$_3$(CF$_2$)$_5$CH$_2$— | 2.14 | 7 | B | 62,000 |
| 32 | 3 —(H$_{12}$MDI—PEG)$_5$—H$_{12}$MDI— | | 0.25 | n-C$_{14}$H$_{29}$— | 1.25 | 4 | B | 5,600 |
| 33 | 3 —(DMDPD—PEG)$_5$—DMDPD— | | 0.25 | n-C$_{14}$H$_{29}$— | 1.25 | 4 | B | 5,200 |

TABLE 6-continued $^a$All of the B's have the structure —O—CH$_2$—CH—O—(DIISO—O—CH$_2$—CH—O)$_n$—where DIISO is the appropriate diisocyanate and n is recorded in the column provided for B.

EXAMPLES 34–39
PREPARATION OF POLYHYDROPHOBIC AND ETHOXYLATED POLYHYDROPHOBIC DIOL POLYMERS IN SOLUTION

The same procedure was used as in Examples 23–33 except that the initial charge is composed of toluene, the polyether and a polyhydrophobic or ethoxylated polyhydrophobic diol. Water is removed azeotropically, the temperature is adjusted to 60°–85° C. and the catalyst is added. All of the diisocyanate is added in one portion and the reaction mixture is stirred at 60°–85° C. for 3 to 24 hours. The viscous product is poured into shallow pans to evaporate the toluene solvent at atmospheric conditions, with the results listed in Table 7, using the same format as in Table 6.

EXAMPLES 40–43
PREPARATION OF POLYMERS FROM ETHOXYLATED POLYHYDROPHOBIC DIOLS IN BULK

The polyether and the ethoxylated polyhydrophobic diols are charged to a polypropylene beaker and heated in an oven at 85°–120° C. The phenyl mercuric acetate catalyst (0.1–0.4% based on total weight of reactants) is charged and the mixture is stirred well with an air driven mechanical stirrer. The diisocyanate is added and the mixture again stirred well for 15–60 seconds. The mixture is then poured into a ⅛″ thick glass or polypropylene mold and cured at 85°–120° C. for 1–5 hours. The product is cooled, removed from the mold and cut into smaller pieces. The results are set forth in

TABLE 7

| | Composition | | | | | | |
|---|---|---|---|---|---|---|---|
| | Materials | | | | Molar Ratio | | |
| Example | PEG mol. wt. | Diol | Diisocyanate | Catalyst | PEG | Diol | Diisocyanate | A |
| 34 | 8000 | Example #11 | IPDI | PMA | 27 | 5 | 31 | 6 —(PEG—IPDI)$_{3.5}$PEG— |
| 35 | 8000 | Example #12 | IPDI | PMA | 27 | 5 | 31 | 6 —(PEG—IPDI)$_{3.5}$PEG— |
| 36 | 8000 | Example #13 | IPDI | PMA | 27 | 5 | 31 | 6 —(PEG—IPDI)$_{3.5}$PEG— |
| 37 | 8000 | Example #17 | TDI | DBTDL | 36 | 8 | 43 | 9 —(PEG—TDI)$_3$PEG— |
| 38 | 8000 | Example #18 | TDI | DBTDL | 72 | 11 | 82 | 12 —(PEG—TDI)$_5$PEG— |
| 39 | 8000 | Example #19 | TDI | DBTDL | 36 | 8 | 43 | 9 —(PEG—TDI)$_3$PEG— |

| | | | | | Aqueous Viscosity | |
|---|---|---|---|---|---|---|
| Example | B$^a$ | C | $\bar{y}$ | x | Method | 2% |
| 34 | m = 0, n = 2 | n-C$_{10}$H$_{21}$— | 3.0 | 5 | B | 72,000 |
| 35 | m = 0, n = 2 | n-C$_{18}$H$_{37}$— | 3.0 | 5 | B | 27,000 |
| 36 | m = 0, n = 2 | Mixture of C$_{22-26}$ hydrocarbons | 3.0 | 5 | B | 45,000 |
| 37 | m = 73, n = 1 | n-C$_{14}$H$_{29}$— | 2.0 | 8 | B | 70,000 |
| 38 | m = 67, n = 2 | n-C$_{14}$H$_{29}$— | 3.0 | 11 | B | 100,000 |
| 39 | m = 77, n = 3 | n-C$_{14}$H$_{29}$— | 4.0 | 8 | B | 50,000 |

$^a$The structure of B is

DIISO—(O—CH$_2$—CH$_2$)$_m$—O—CH—CH$_2$—O—CH$_2$—CH$_2$—O—CH$_2$CH$_2$O—(CH$_2$—CH—O)$_n$—(CH$_2$—CH$_2$—O)$_m$—DIISO— where DIISO is the appropriate diisocyanate and m and n are given in column B.

TABLE 8

| | Composition | | | | | | |
|---|---|---|---|---|---|---|---|
| | Materials | | | | Molar Ratio | | |
| Example | PEG mol. wt. | Diol | Diisocyanate | Catalyst | PEG | Diol | Diisocyanate |
| 40 | 8000 | Example #17 | IPDI | PMA | 36 | 8 | 43 |
| 41 | 8000 | Example #18 | IPDI | PMA | 45 | 11 | 55 |
| 42 | 8000 | Example #18 | IPDI | PMA | 72 | 11 | 82 |
| 43 | 8000 | Example #19 | TDI | PMA | 36 | 8 | 43 |

| | | | | | | Aqueous Viscosity | |
|---|---|---|---|---|---|---|---|
| Example | A | B$^a$ | C | $\bar{y}$ | x | Method | 2% |
| 40 | 9 —(PEG—IPDI)$_3$PEG— | m = 73 n = 1 | n-C$_{14}$H$_{29}$— | 2.0 | 8 | B | 26,000 |
| 41 | 12 —(PEG—IPDI)$_{2.75}$PEG— | m = 67 n = 2 | n-C$_{14}$H$_{29}$— | 3.0 | 11 | B | 89,000 |
| 42 | 12 —(PEG—IPDI)$_5$PEG— | m = 67 n = 2 | n-C$_{14}$H$_{29}$— | 3.0 | 11 | B | 93,000 |

TABLE 8-continued

| | 43 | 9 —(PEG—TDI)₃PEG— | m = 77 n = 3 | n-C₁₄H₂₉— | 4.0 | 8 | B | 52,000 |

$^a$The structure of B is

—DIISO—(O—CH₂CH₂)$_m$—O—CH—CH₂—O—CH₂—CH₂—O—CH₂—CH₂—O—(CH₂—CH—O)$_n$(CH₂CH₂—O)$_m$—DIISO— where DIISO is the appropriate diisocyanate and m and n are given in column B.

EXAMPLES 44–47
COMPARATIVE ANALYSIS OF EMMONS ET AL. TYPE POLYMERS

This example compares the polymers disclosed in U.S. Pat. No. 4,079,028 (Emmons, et al.) with corresponding polymers but which contain segments of bunched hydrophobes in place of the end-capping hydrophobes disclosed in Emmons, et al., using the procedure described in Examples 18–74T of the Emmons et al. patent. Following the bunch capping procedures described previously using the hydrophobic alcohol compounds listed in Table 9, the results demonstrate the highly superior thickening performance of the polymers containing segments of bunched hydrophobes in Examples 45 and 47 having a y value of 3, i.e. 3 hydrophobes per bunch, when compared with the unbunched prior art polymers of Example B 44 and 46.

EXAMPLES 48–50
COMPARATIVE ANALYSIS OF EVANI I TYPE POLYMERS

This example compares the polymers disclosed in U.S. Pat. No. 3,779,970 (Evani I) produced by methods described in Examples 1 and 2, with such polymers modified to have hydrophobic segments containing bunches of hydrophobes substituted for the single hydrophobes of the Evani I patent using the bunch capping procedures described previously. The results in Table 10 clearly set forth the greatly superior thickening action exhibited by the bunched polymers in Examples 49 and 50 with a bunching value, $\bar{y}$, of 3, even when the polymers, on the average, contain relatively few bunched segments per polymer molecule, of 1.2 and 0.4, respectively.

TABLE 9

| | | Composition | | | | | |
|---|---|---|---|---|---|---|---|
| | Materials | | | Molar Ratio | | | |
| Example | Alcohol | PEG mol. wt. | Diisocyanate | Alcohol | PEG | Diisocyanate | A |
| 44 | Cetyl Alcohol | 8000 | TDI | 2 | 6 | 7 | —(PEG—TDI)₅—PEG— |
| 45 | Example #20 | 8000 | TDI | 2 | 6 | 7 | —(PEG—TDI)₅—PEG— |
| 46 | Cetyl | 8000 | TDI | 2 | 12 | 13 | —(PEG—TDI)₁₁—PEG— |
| 47 | Example #20 | 8000 | TDI | 2 | 11 | 12 | —(PEG—TDI)₁₀—PEG— |

| Example | B | C | $\bar{y}$ | x | Aqueous Viscosity Method | 2% |
|---|---|---|---|---|---|---|
| 44 | —O—TDI— | n-C₁₆H₃₃— | 1.0 | 2 | A | 6,400 |
| 45 | —O—(CH₂—CH—O)₂—TDI— | 2 n-C₁₆H₃₃— / 4 n-C₁₄H₂₉— | 3.0 | 2 | A | 49,000 |
| 46 | —O—TDI— | n-C₁₆H₃₃— | 1.0 | 2 | A | 1,100 |
| 47 | —O—(CH₂—CH—O)₂—TDI— | 2 n-C₁₆H₃₃— / 4 n-C₁₄H₂₉— | 3.0 | 2 | A | 20,000 |

TABLE 10

| Example | Alcohol | Composition, Wt % | | | B | C | $\bar{y}$ | $x^a$ | 2% Aqueous Viscosity |
|---|---|---|---|---|---|---|---|---|---|
| | | SMA | Alcohol | A | | | | | |
| 48 | Example #21 | 95 | 5 | SMA | —(O—CH₂CH₂)₄₀—O— | n-C₁₆H₃₃— | 1.0 | 1.3 | 620 |
| 49 | Example #22 | 95 | 5 | SMA | —(O—CH₂CH—O)₂—(CH₂—CH₂—O)₃₄— | 1 n-C₁₆H₃₃— / 2 n-C₁₄H₂₉— | 3.0 | 1.2 | 57,000 |
| 50 | Example #22 | 98.2 | 1.8 | SMA | —(O—CH₂CH—O)₂—(CH₂—CH₂—O)₃₄— | 1 n-C₁₆H₃₃— / 2 n-C₁₄H₂₉— | 3.0 | 0.4 | 33,000 |

$^a$It should be noted that even in the case where the average value of x is 0.4 approximately 7% of the molecules will contain 2 or more bunches of hydrophobes and 34% 1 or more bunches; when the average value of x is 1.2, 34% of the molecules will contain 2 or more bunches of hydrophobes and 70% with 1 or more bunches.

Product Analyses

EXAMPLE 51
SURFACTANT ADDITION TO POLYMERS WITH HYDROPHOBE BUNCHES

This example demonstrates that the addition of surfactants to the thickening polymers of the present invention in aqueous solution will result in an initial decrease in viscosity. The results set forth in Table 11 are for the polymer produced in Example 50 to which the specified weight percent of the ethoxylated cetyl alcohol of Example 21 as surfactant has been added. The results show a viscosity decrease upon the initial addition of the surfactant, as distinguished from "hydrophobe poor" polymers disclosed in the prior art which contain no or insufficient bunches of hydrophobes which polymers are disclosed to exhibit initial increases in viscosity upon surfactant addition.

TABLE 11
SURFACTANT ADDITION TO POLYMER WITH BUNCHED HYDROPHOBES IN AQUEOUS SOLUTION

| Wt. % Surfactant | Viscosity | Log Viscosity |
|---|---|---|
| 0 | 39,000 | 4.59 |
| 0.1 | 15,320 | 4.19 |
| 0.2 | 8,920 | 3.95 |
| 0.3 | 5,240 | 3.72 |
| 0.4 | 2,176 | 3.34 |
| 0.5 | 832 | 2.92 |
| 0.6 | 378 | 2.58 |
| 0.7 | 192 | 2.28 |
| 0.8 | 120 | 2.08 |
| 0.9 | 92 | 1.96 |
| 1.0 | 68 | 1.83 |
| 1.25 | 50 | 1.70 |
| 2.0 | 26 | 1.41 |

EXAMPLE 52
NONAQUEOUS APPLICATION SETTLING RATE OF CaCO₃ IN STYRENE

A wide mouth jar is charged with styrene and a 20% styrene solution of the polymer. Dissolution is effected by rolling the sealed jar on a roll mill. To this solution is added calcium carbonate, $CaCO_3$, filler. The sealed jar is returned to the roller for approximately one hour. The mixture is removed from the roller and the time required for the $CaCO_3$ to settle, as evidenced by the appearance of a clear liquid upper layer, is noted. The polymers produced in the previous examples as set forth in Table 12 were tested, with the results showing that suspension time is increased due to the addition of the polymers of the present invention.

TABLE 12
POLYMERS WITH HYDROPHOBIC BUNCHES AS SUSPENDING AGENTS

| Polymer, Example # | Composition, Wt. % Styrene | 20% Polymer | CaCO₃ | Wt. % Polymer | Time (min) |
|---|---|---|---|---|---|
| None | 100 | 0 | 100 | 0 | <0.25 |
| 23 | 95 | 5 | 100 | 0.5 | 5 |
| 41 | 95 | 5 | 100 | 0.5 | 6 |
| 23 | 75 | 25 | 100 | 2.5 | 60 |
| 41 | 75 | 25 | 100 | 2.5 | 70 |

EXAMPLES 53–58
PAINT COMPOSITIONS CONTAINING POLYMERS WITH HYDROPHOBIC BUNCHES

These examples set forth the properties of various polymers of the present invention in paint composition, with the results listed in Table 13, based on the following acrylic latex paint formulations:

| Material | Lbs/100 gal | Lbs/100 gal |
|---|---|---|
| PIGMENT GRIND: | | 345.1–347.1[a] |
| Propylene Glycol | 75 | |
| Dispersant (Tamol SG-1) | 11.6 | |
| Defoamer (Deefo 495) | 2.5 | |
| Pigment, TiO₂ (Zopaque RCL-9) | 255 | |
| Preservative[b] | 1 (3) | |
| LET DOWN: | | |
| Acrylic Latex (Rhoplex AC 388) | | 496 |
| Defoamer (Deefo 495) | | 2.5 |
| Propylene Glycol | | 20.0 |
| Coalescing Solvent (Texanol) | | 20.0 |
| Anionic Surfactant (Triton GR-7M) | | 0.5 |
| Ammonia, Concentrate 28% | | 2.0 |
| Experimental Thickener (2.5% solids) | | See Table 13 |
| Water to make | | 100 gallons |

[a]Examples 53–55 contained 345.1 Lbs/100 gals pigment grind; Examples 56–58 contained 347.1 Lbs/100 gals pigment grind.
[b]Examples 53–55 contained 1.0 lb Super-Ad-it (mildewcide) as a preservative; Examples 56–58 contained 3.0 lb. Nuosept-95 as a preservative.

TABLE 13
PAINT ANALYSIS

| Paint Example | Polymer Thickener | Amount lbs/100 gals 2.5% solution | Solids | Viscosity[b] Brookfield, Centipoise | Stormer K.U. | ICI, Poise | Leneta Sag | Leneta Leveling | Brushout Sag | Brushout Leveling |
|---|---|---|---|---|---|---|---|---|---|---|
| 53 | Example #23 | 92 | 2.3 | 115 | 83 | 0.9 | 6 | — | Slight | 9 |
| 54 | Example #24 | 116 | 2.9 | 840 | 100 | 0.9 | 14 | — | Nil | 8 |
| 55 | Hydroxyethyl cellulose[a] | 70 | 1.75 | 1000 | 82 | 0.9 | 20 | — | Nil | 6 |
| 56 | Example #41 | 92 | 2.3 | 1520 | 78 | 0.8 | 25 | 8 | Low | 8 |
| 57 | Example #42 | 140 | 3.5 | 1600 | 89 | 1.1 | 30 | 7 | Nil | 7 |
| 58 | Hydroxyethyl cellulose[a] | 70 | 1.75 | 1800 | 88 | 1.1 | 20 | 6 | Nil | 6 |

[a]having a 2% aqueous Brookfield viscosity of 15,000 centipoise.
[b]After 24 hours

We claim:
1. A water-soluble, thermoplastic, organic polymer having a weight average molecular weight of at least about 10,000 which comprises hydrophobic segments, each containing at least one monovalent hydrophobic group covalently bonded to the polymer, wherein the polymer has an amount of hydrophobe bunching comprising at least two monovalent hydrophobic groups per hydrophobic segment, sufficient to provide for enhanced thickening of aqueous solutions containing the polymer.

2. The polymer of claim 1 wherein said polymer, when compared with a polymer of essentially the same structure but which has single monovalent hydrophobic groups in place of bunches of monovalent hydrophobic groups, has a greater capacity of thickening aqueous solutions.

3. The polymer of claim 1 wherein each hydrophobe bunch contains at least two monovalent hydrophobic groups which are separated from each other by no more than about 50 covalently bonded sequentially connected atoms.

4. The polymer of claim 3 wherein said hydrophobe bunch contains at least two monovalent hydrophobic groups which are prearranged to be separated from each other by no more than about 50 covalently bonded sequentially connected atoms.

5. The polymer of claim 1 wherein the amount of hydrophobe bunching is an average of from about 0.4 to about 11 bunched hydrophobe segments per molecule.

6. The polymer of claim 1 wherein the amount of hydrophobe bunching is greater than an average of about 0.25 bunched hydrophobe segments per polymer molecule.

7. The polymer of claim 1 wherein each monovalent hydrophobic group provides a molar volume contribution of greater than about 70 cubic centimeters per mole and has a nominal contribution to the calculated solubility parameter of less than about 9.5 $(cal./cc)^{\frac{1}{2}}$.

8. The polymer of claim 7 wherein each monovalent hydrophobic group provides a molar volume contribution of greater than about 160 cubic centimeters per mole.

9. The polymer of claim 7 wherein each monovalent hydrophobic group has a nominal contribution to the calculated solubility parameter of from about 6.5 to about 8.5 $(cal./cm)^{\frac{1}{2}}$.

10. The polymer of claim 1 wherein there are an average of greater than about 1.2 monovalent hydrophobic groups per hydrophobic segment.

11. The polymer of claim 1 wherein there are an average of from 2 to about 6 monovalent hydrophobic groups per bunch.

12. The polymer of claim 11 wherein there are an average of from about 3 to 4 monovalent hydrophobic groups per bunch.

13. The polymer of claim 1 containing a sufficient number of bunched segments to provide for the generation of micelle-like associations when the polymer is in aqueous solution.

14. The polymer of claim 1 wherein a substantial proportion of hydrophobic segments have bunched hydrophobes.

15. The polymer of claim 1 wherein essentially all hydrophobic segments have bunched hydrophobes.

16. The polymer of claim 1 containing from about 2 to about 25 hydrophobic segments.

17. The polymer of claim 1 containing about 7 to about 11 hydrophobic segments.

18. The polymer of claim 1 having the structure:

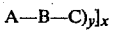

wherein A is a water-soluble polymer segment; B is a divalent connecting segment comprising a covalent bond or an organic radical; C is a monovalent hydrophobic group; the number of hydrophobic segments, x, defined by B—C)$_y$, is greater than 0; and the number of hydrophobes, C, for each hydrophobic segment, defined as y, is greater than or equal to 1 providing an average of all y values of greater than 1, such that the polymer has an amount of hydrophobe bunching, comprising at least two monovalent hydrophobic groups per hydrophobic segment, sufficient to provide for enhanced thickening of aqueous solutions containing the polymer.

19. The polymer of claim 18 wherein A is a synthetic, water-soluble polymer backbone.

20. The polymer of claim 18 wherein:
(1) A is:

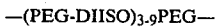

wherein PEG is a polyethylene glycol and DIISO is toluene diisocyanate or isophorone diisocyanate;
(2) B is:

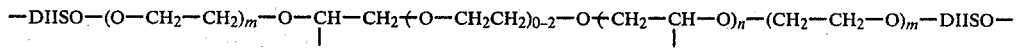

wherein:
m is from 0 to about 77,
n is from about 0.1 to about 3, and
DIISO is as defined previously;
(3) C is $C_{10}$–$C_{26}$ alkyl;
(4) the average, y, of the sum of the y values is from about 1.1 to about 4; and
(5) x is from about 2 to about 11.

21. The polymer of claim 20 wherein the polyethylene glycol has a molecular weight of about 8,000; m is 0; C is $C_{10}$–$C_{18}$ alkyl; and x is between about 2 to about 5.

22. A latex composition containing water and the polymer of claim 1.

23. A thickened aqueous composition containing water and the polymer of claim 1.

24. The polymer of claim 1 wherein the water-soluble polymer is a condensation or addition polymer.

25. The polymer of claim 24 wherein the condensation polymer is a polyurethane.

26. The polymer of claim 25 wherein the polyurethane is a polyether polyurethane.

27. The polymer of claim 26 wherein the polyether polyurethane is produced from an organic diisocyanate, a polyether diol and a dihydroxy hydrophobic compound.

28. The polymer of claim 27 wherein the dihydroxy hydrophobic compound is 1,2-hexadecanediol.

29. The polymer of claim 27 wherein the polyether polyurethane has terminal hydroxyl groups, produced by reacting an excess of polyether diol and dihydroxy hydrophobic compound with the organic diisocyanate.

30. The polymer of claim 27 wherein the organic diisocyanate is selected from the group consisting of toluene diisocyanate, isophorone diisocyanate, 3,3′-dimethyl-4,4′-diphenyl diisocyanate and 4,4′-methylene bis(isocyanatocyclohexane).

31. The polymer of claim 27 wherein the polyether diol is a polyethylene glycol having a molecular weight of from about 600 to about 50,000.

32. The polymer of claim 27 wherein the dihydroxy hydrophobic compound is the reaction product of an alkylene diol and a $C_{10}$ to $C_{28}$ alpha-olefin epoxide.

33. The polymer of claim 27 wherein the organic diisocyanate is isophorone diisocyanate, the polyether diol is a polyethylene glycol having a molecular weight of about 8,000, and the dihydroxy hydrophobic compound is the reaction product of an ethylene glycol and $C_{12}-C_{20}$ alpha-olefin epoxide.

34. A process for producing a water-soluble, thermoplastic organic polymer having a weight average molecular weight of at least about 10,000, which comprises either:
  (a) bonding (1) functional group containing hydrophobic reactants having a hydrophobe bunch of at least two monovalent hydrophobic groups with (2) a water-soluble polymer reactant containing a complementary functional group whereby said hydrophobe bunch is covalently bonded to the polymer; or
  (b) interreacting (1) a functional hydrophobic reactant having a hydrophobe bunch of at least two monovalent hydrophobic groups with (2) a complementary functional, water-soluble prepolymer or monomer whereby the two are copolymerized to provide a water-soluble polymer containing said hydrophobe bunches; or
  (c) interreacting (1) a functional hydrophobic reactant having a monovalent hydrophobic group with (2) a complementary functional water-soluble prepolymer whereby the two are copolymerized to provide a water-soluble polymer having at least one hydrophobe bunch containing at least two monovalent hydrophobic groups.

35. The process of claim 34 wherein a functional connecting monomer is added having complementary functionality to the hydrophobic and water-soluble reactants to form a linking segment between the water-soluble and hydrophobic portions of the polymer.

36. The process of claim 35 wherein the connecting monomer selectively polymerizes with either the hydrophobic reactant or water-soluble prepolymer in step (c) to form the hydrophobe bunching.

37. The process of claim 35 wherein the hydrophobic reactant is an alkyl diol; the connecting monomer is an organic diisocyanate; and the water-soluble polymer reactant is a polyether diol; thereby providing a polyether polyurethane.

38. The process of claim 37 wherein the organic diisocyante is isophorone diisocyanate, a toluene diisocyanate, or methylene dianiline diisocyanate.

39. The process of claim 38 wherein the polyether diol is an ethylene oxide homopolymer or copolymer with a lower alkylene oxide, which polyether diol has a molecular weight of from about 600 to about 50,000.

40. A process for producing a thickened aqueous solution by providing a water solution with an effective thickening amount of a water-soluble, thermoplastic, organic polymer having a weight average molecular weight of at least about 10,000 which comprises segments each containing at least one monovalent hydrophobic group covalently bonded to the polymer, wherein the polymer has an amount of hydrophobe bunching comprising at least two monovalent hydrophobic groups per hydrophobic segment, sufficient to provide for enhanced thickening of aqueous solutions containing the polymer.

* * * * *

UNITED STATES PATENT AND TRADEMARK OFFICE
CERTIFICATE OF CORRECTION

PATENT NO. : 4,426,485
DATED : January 17, 1984
INVENTOR(S) : Hoy et al.

It is certified that error appears in the above—identified patent and that said Letters Patent is hereby corrected as shown below:

Column 8, line 21, "n-phenylphenyls" should read -- n-pentylphenyls --.

Column 8, line 60, "$B(C)_y$" should read -- $B(C)_y$ --.

Column 14, lines 60-64, that portion of Formula (p) reading "$OCH_2$" should read -- $OCH_2$ --.

Column 34, line 5, at claim 18, line 2, "$A-B-C-)_y]_x$" should read -- $A[B(C)_y]_x$ --.

Column 34, line 11, at claim 18, line 7, "$B-C)_y$" should read -- $B(C)_y$ --.

Column 34, line 40, ",y," should read -- , $\bar{y}$, --.

Signed and Sealed this

Tenth Day of July 1984

[SEAL]

Attest:

GERALD J. MOSSINGHOFF

Attesting Officer

Commissioner of Patents and Trademarks